US010045046B2

(12) United States Patent
Panchal et al.

(10) Patent No.: US 10,045,046 B2
(45) Date of Patent: Aug. 7, 2018

(54) ADAPTIVE SUPPORT FOR INTERPOLATING VALUES OF SUB-PIXELS FOR VIDEO CODING

(75) Inventors: Rahul P. Panchal, San Diego, CA (US); Marta Karczewicz, San Diego, CA (US); Peisong Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 495 days.

(21) Appl. No.: 13/311,755

(22) Filed: Dec. 6, 2011

(65) Prior Publication Data

US 2012/0147967 A1 Jun. 14, 2012

Related U.S. Application Data

(60) Provisional application No. 61/422,051, filed on Dec. 10, 2010.

(51) Int. Cl.
*H04N 7/12* (2006.01)
*H04N 11/02* (2006.01)
(Continued)

(52) U.S. Cl.
CPC ......... *H04N 19/523* (2014.11); *H04N 19/117* (2014.11); *H04N 19/154* (2014.11); *H04N 19/182* (2014.11); *H04N 19/80* (2014.11)

(58) Field of Classification Search
CPC ...... H04N 7/50; H04N 7/364; H04N 7/26808; H04N 5/145; H04N 7/26765;
(Continued)

(56) References Cited

U.S. PATENT DOCUMENTS 7,792,191 B2   9/2010   Kwon
7,840,096 B2   11/2010  Song
(Continued)

FOREIGN PATENT DOCUMENTS

CN   1671209 A   9/2005
CN   1889691 A   1/2007
(Continued)

OTHER PUBLICATIONS

Karczewicz, M. et al., "Video Coding Technology Proposal by Qualcomm Inc.," Joint Collaborative Team on Video Coding, Document JCTVC-A121, Apr. 15-23, 2010, 24 pp.
(Continued)

*Primary Examiner* — On S Mung
(74) *Attorney, Agent, or Firm* — Shumaker & Sieffert, P.A.

(57) ABSTRACT

This disclosure describes techniques for calculating values of sub-integer pixels applied by an encoder and a decoder to encode blocks of video data. In one example, a video encoder is configured to receive values for a full integer pixel positions of a reference sample, apply an interpolation filter to a first set of the values for the full integer pixel positions to calculate a value for a first sub-integer pixel of one of the full integer pixel positions, apply the interpolation filter to a second, different set of the values for the full integer pixel positions to calculate a value for a second, different sub-integer pixel of the one of the full integer pixel positions, encode a current block of pixels using a motion vector that points to one of the first sub-integer pixel and the second sub-integer pixel.

36 Claims, 16 Drawing Sheets

US 10,045,046 B2
Page 2

(51) Int. Cl.
  *H04N 19/523* (2014.01)
  *H04N 19/117* (2014.01)
  *H04N 19/80* (2014.01)
  *H04N 19/154* (2014.01)
  *H04N 19/182* (2014.01)

(58) Field of Classification Search
  CPC .... H04N 19/197; H04N 19/176; H04N 19/70; H04N 19/523; H04N 19/117; H04N 19/80; H04N 19/15
  USPC ............ 375/240.02, 240.16, 240.17, 240.29
  See application file for complete search history.

(56) References Cited

U.S. PATENT DOCUMENTS

| | | | |
|---|---|---|---|
| 8,149,910 B2 | 4/2012 | Tanizawa et al. | |
| 8,634,456 B2 | 1/2014 | Chen et al. | |
| 2003/0112864 A1* | 6/2003 | Karczewicz | G06T 3/4007 375/240.01 |
| 2003/0169931 A1* | 9/2003 | Lainema | 382/236 |
| 2004/0062307 A1* | 4/2004 | Hallapuro et al. | 375/240.13 |
| 2004/0196909 A1 | 10/2004 | Kwon | |
| 2005/0207496 A1 | 9/2005 | Komiya et al. | |
| 2006/0146935 A1 | 7/2006 | Winger | |
| 2006/0291563 A1 | 12/2006 | Park et al. | |
| 2006/0294171 A1* | 12/2006 | Bossen et al. | 708/300 |
| 2008/0063307 A1 | 3/2008 | De Haan | |
| 2009/0022220 A1* | 1/2009 | Vatis et al. | 375/240.12 |
| 2009/0220005 A1 | 9/2009 | Kim et al. | |
| 2009/0257493 A1* | 10/2009 | Ye | H04N 7/364 375/240.12 |
| 2009/0257499 A1 | 10/2009 | Karczewicz et al. | |
| 2009/0257500 A1 | 10/2009 | Karczewicz et al. | |
| 2009/0257502 A1 | 10/2009 | Ye et al. | |
| 2009/0257668 A1 | 10/2009 | Ye et al. | |
| 2010/0002770 A1 | 1/2010 | Motta et al. | |
| 2010/0086027 A1 | 4/2010 | Panchal et al. | |
| 2010/0111182 A1 | 5/2010 | Karczewicz et al. | |
| 2010/0135398 A1 | 6/2010 | Wittmann et al. | |
| 2010/0226432 A1* | 9/2010 | Wittmann et al. | 375/240.12 |
| 2010/0246692 A1 | 9/2010 | Rusanovskyy et al. | |
| 2010/0246998 A1 | 9/2010 | He et al. | |
| 2010/0296587 A1 | 11/2010 | Rusanovskyy et al. | |
| 2012/0147967 A1 | 6/2012 | Panchal et al. | |

FOREIGN PATENT DOCUMENTS

| | | |
|---|---|---|
| CN | 101242506 A | 8/2008 |
| GB | 2379820 | 3/2003 |
| JP | 2007201880 A | 8/2007 |
| RU | 2317654 C2 | 2/2008 |
| RU | 2369038 C1 | 9/2009 |
| WO | 03026296 A1 | 3/2003 |
| WO | 2008084378 A2 | 7/2008 |
| WO | 2009126911 A1 | 10/2009 |
| WO | 2009126915 A1 | 10/2009 |
| WO | 2009126929 A1 | 10/2009 |
| WO | 2010005808 A1 | 1/2010 |
| WO | 2010039492 A2 | 4/2010 |

OTHER PUBLICATIONS

Rusanovksyy, D. et al., "Adaptive Interpolation with Directional Filters," ITU-Telecommunications Standardization Sector, Document VCEG-AG21, Oct. 20, 2007, 4 pp.
Ugur, K. et al., "Description of video coding technology proposal by Tandberg, Nokia, Ericsson," Joint Collaborative Team on Video Coding, Document JCTVC-A119, Apr. 15-23, 2010, 33 pp.
International Search Report and Written Opinion of international application No. PCT/US2011/063730, dated Feb. 28, 2012, 12 pp.
Ugur, K. et al., "Low Complexity Video Coding and the Emerging HEVC Standard," IEEE Picture Coding Symposium 2010, Dec. 8-10, 2010, 4 pp.
U.S. Appl. No. 13/283,196, by Wei-Jung Chien, filed Oct. 27, 2011.
Vatis, et al., 'Comparison of complexity between two-dimensional non-separable adaptive interpolation filter and standard wiener filter,' ITU-T SG16/Q.6 VCEG-AA11, Nice, France, Oct. 2005, 4 pages.
Wittmann, et al., "Separable Adaptive Interpolation Filter for Video Coding," ITU-T SG16/Q.6 Doc. T05-SG16-C-0219, Geneva, Switzerland, Jun. 2007, 4 pp.
Ugur et al., "Adaptive MV resolution with directional filters," Document JCTVC-C215, 3rd Meeting: Guangzhou, CN, Oct. 7-15, 2010, 4 pp.
Sekiguchi et al., "Suggested approach toward HEVC Test Model creation," Document JCTVC-C121, 3rd Meeting: Guangzhou, CN, Oct. 7-15, 2010, 5 pp.
PowerPoint presentation: JCTVC-C121: "Suggested approach toward HEVC Test Model creation," Mitsubishi Electric, accessed Oct. 11, 2011, 6 pp.
Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.
Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
International Preliminary Report on Patentability—PCT/US2011/063730, The International Bureau of WIPO—Geneva, Switzerland, dated Apr. 3, 2013, 21 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Wiegand, T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012].
Wiegand, T., et al., "WD3: Working Draft 3 of High-Efficiency Video Coding," Document JCTVC-E603, 5th Meeting: Geneva, CH, Mar. 16-23, 2011, pp. 193.
Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.
Second Written Opinion from international application No. PCT/US2011/063730, dated Jan. 14, 2013, 6 pp.
Office Action from U.S. Appl. No. 13/283,196, dated May 16, 2014, 14 pp.
Zhang, et.al., "Single-Pass Encoding Using Multiple Adaptive Interpolation Filters", [online], Apr. 15-18, 2009, ITU-Telecommunications Standardization Sector Study Group 16 Question 6 Video Coding Experts Group (VCEG), Document: VCEG-AK26, 7 pp.
Alshina "CE3: Cross-check by Samsung for Motorola Mobility Tests (JCTVC-F574,576) by Samsung", Joint Collaborative Team on Video Coding (JCT-VC) of ITU-T SG16 WP3 and ISO/IEC JTC1/SC29/WG11, JCTVC-F443, 6th Meeting: Torino, IT, Jul. 14-22, 2011, 10 pp.
Bossen, "Common Test Conditions and Software Reference Configurations", Joint Collaborative Team on Video Coding (JCT-VC) of ITU-T SG16 WP3 and ISO/IEC JTC1/SC29/WG11, JCTVC-E700 WG11 No. m20235, 4th Meeting: Daegu, KR, Jan. 20-28, 2011, 11 pp.
Lou, et al., "CE3: Fixed interpolation filter tests by Motorola Mobility", Joint Collaborative Team on Video Coding (JCT-VC) of ITU-T SG16 WP3 and ISO/IEC JTC1/SC29/WG11, JCTVC-F574, 6th Meeting: Torino, IT, Jul. 14-22, 2011, 10 pp.
European Search Report—EP17162467—Search Authority—Munich—dated Jul. 4, 2017.

\* cited by examiner

ADAPTIVE SUPPORT FOR INTERPOLATING VALUES OF SUB-PIXELS FOR VIDEO CODING

This application claims the benefit of U.S. Provisional Application No. 61/422,051, filed Dec. 10, 2010, the entire content of which is incorporated herein by reference.

TECHNICAL FIELD

This disclosure relates to the field of video coding, e.g., encoding and decoding video data.

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, and the like. Digital video devices implement video compression techniques, such as MPEG-2, MPEG-4, or H.264/MPEG-4, Part 10, Advanced Video Coding (AVC), to transmit and receive digital video more efficiently. Video compression techniques perform spatial and temporal prediction to reduce or remove redundancy inherent in video sequences.

SUMMARY

This disclosure describes filtering techniques that may be applied by an encoder and a decoder during the inter-prediction stage of a video encoding and/or decoding process. The described filtering techniques may enhance the accuracy of predictive data used during fractional pixel interpolation, and in some cases, may increase coding gains. There are several aspects to this disclosure, including techniques to interpolate values for sub-pixel positions based on applying the interpolation filter to various combinations of full-pixel positions. The values to which an interpolation filter is applied are typically referred to as "support." These techniques also include selecting the support to which to apply an interpolation filter for a sub-pixel position based on factors such as, for example, previously encoded frames or current encoding of frames.

In one aspect, a method of encoding video data comprises receiving values for a full integer pixel positions of a reference sample. The method also includes applying an interpolation filter to a first set of the values for the full integer pixel positions to calculate a value for a first sub-integer pixel of one of the full integer pixel positions. Further, the method also includes applying the interpolation filter to a second, different set of the values for the full integer pixel positions to calculate a value for a second, different sub-integer pixel of the one of the full integer pixel positions. The method further comprises encoding a block of pixels using a motion vector that points to one of the first sub-integer pixel and the second sub-integer pixel.

In another aspect, a device comprises a video coder that is configured to receive values for a full integer pixel positions of a reference sample. The video coder is also configured to apply an interpolation filter to a first set of the values for the full integer pixel positions to calculate a value for a first sub-integer pixel of one of the full integer pixel positions. Similarly, the video coder is configured to apply the interpolation filter to a second, different set of the values for the full integer pixel positions to calculate a value for a second, different sub-integer pixel of the one of the full integer pixel positions. The video coder is further configured to encode a block of pixels using a motion vector that points to one of the first sub-integer pixel and the second sub-integer pixel.

In another aspect, a computer-readable medium comprises instructions that upon execution in a video coding device cause the device to code video blocks. In particular, the instructions cause the device to receive values for a full integer pixel positions of a reference sample and apply an interpolation filter to a first set of the values for the full integer pixel positions to calculate a value for a first sub-integer pixel of one of the full integer pixel positions. The instructions also cause the device to apply the interpolation filter to a second, different set of the values for the full integer pixel positions to calculate a value for a second, different sub-integer pixel of the one of the full integer pixel positions. The instructions further cause the device to encode a block of pixels using a motion vector that points to one of the first sub-integer pixel and the second sub-integer pixel.

In another aspect, a device is provided that comprises means for receiving values for a full integer pixel positions of a reference sample. The device further comprises means for applying an interpolation filter to a first set of the values for the full integer pixel positions to calculate a value for a first sub-integer pixel of one of the full integer pixel positions. Also, the device comprises means for applying the interpolation filter to a second, different set of the values for the full integer pixel positions to calculate a value for a second, different sub-integer pixel of the one of the full integer pixel positions and means for encoding a block of pixels using a motion vector that points to one of the first sub-integer pixel and the second sub-integer pixel.

In yet another aspect, a method of decoding video data comprises receiving a reference sample comprising a full pixel positions. The method also includes receiving an indication of a set of the full integer pixel positions of the reference sample used to interpolate a value for a sub-integer pixel of the reference sample. Further, the method also includes applying an interpolation filter to the set of the full integer pixel positions to calculate the value of the sub-integer pixel of the reference sample. The method further comprises decoding a block of pixels relative to the calculated value of the sub-integer pixel.

In another aspect, a device comprises a video decoder that is configured to receive a reference sample comprising a full integer pixel positions. The video decoder is also configured to receive an indication of a set of the full integer pixel positions of the reference sample used to interpolate a value for a sub-integer pixel of the reference sample. Similarly, the video decoder is configured to apply an interpolation filter to the set of the full integer pixel positions to calculate the value of the sub-integer pixel of the reference sample. The video decoder is further configured to decode a block of pixels relative to the calculated value of the sub-integer pixel.

In another aspect, a computer-readable medium comprises instructions that upon execution in a video coding device cause the device to code video blocks. In particular, the instructions cause the device to receive a reference sample comprising a full integer pixel positions and receive an indication of a set of the full integer pixel positions of the reference sample used to interpolate a value for a sub-integer pixel of the reference sample. The instructions also cause the device to apply an interpolation filter to the set of the full integer pixel positions to calculate the value of the sub-integer pixel of the reference sample. The instructions further cause the device to decode a block of pixels relative to the calculated value of the sub-integer pixel.

In another aspect, a device comprises means for receiving a reference sample comprising a full pixel positions and means for receiving an indication of a set of the full integer pixel positions of the reference sample to use to interpolate a value for a sub-integer pixel of the reference sample. The device further comprises means for calculating the value of the sub-integer pixel of the reference sample using the set of the full integer pixel positions. The device further includes means for decoding a block of pixels relative to the calculated value of the sub-integer pixel.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software comprising instructions to execute the techniques may be initially stored in a computer-readable medium and loaded and executed by a processor.

Accordingly, this disclosure also contemplates computer-readable media comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

This disclosure may also apply to electromagnetic signals carrying information. For example, an electromagnetic signal may comprise information relating to the full pixel support used to interpolate a value for a sub-integer pixel of a reference sample. In some examples, a signal may be generated from or transmitted by a device implementing the techniques described herein. In other examples, this disclosure may apply to signals that may be received at a device implementing the techniques described herein.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
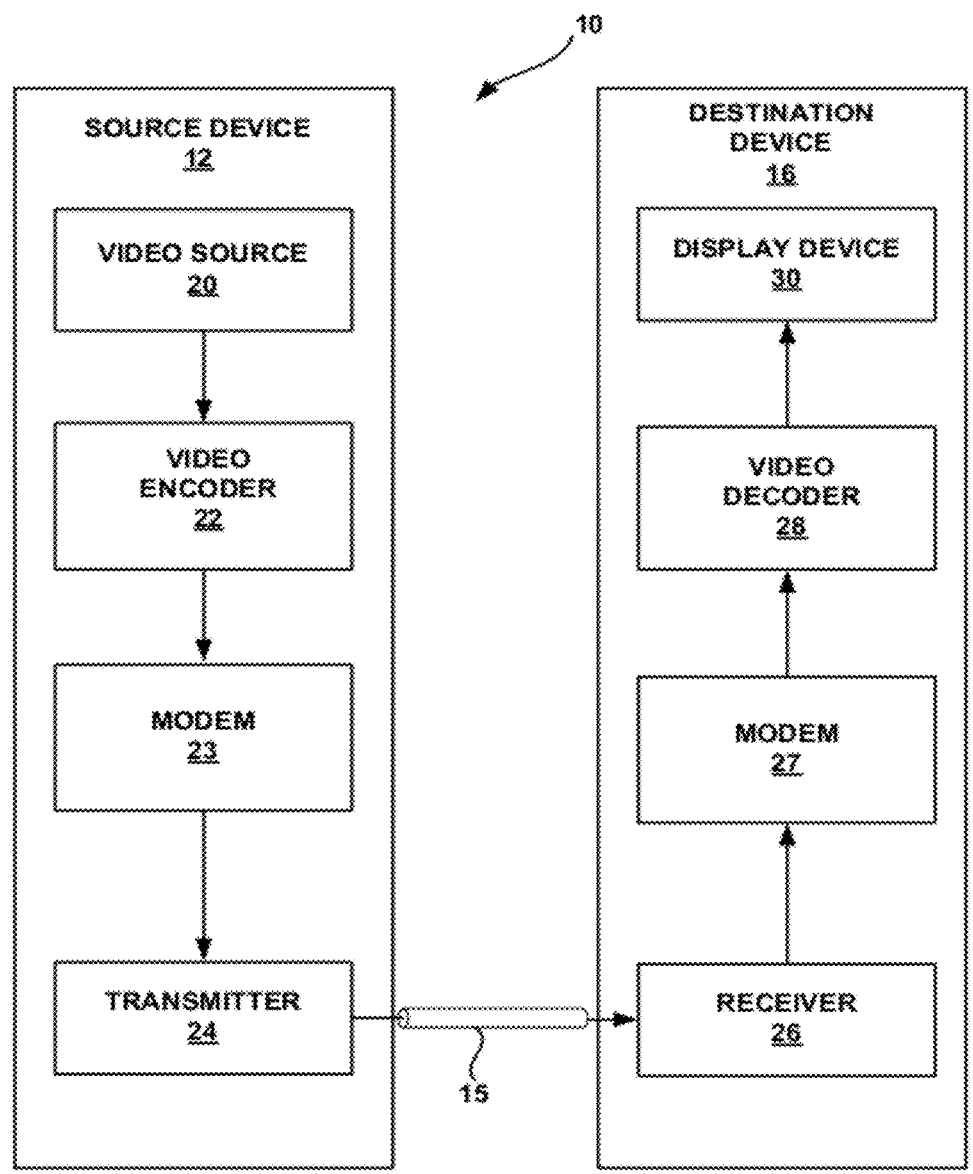
FIG. 1 is a block diagram illustrating one example of a video encoding and decoding system that may be used to implement one or more of the techniques of this disclosure.

This disclosure describes filtering techniques that may be applied by an encoder and a decoder during the inter-prediction stage of a video encoding and/or decoding process. The described filtering techniques may enhance the accuracy of predictive data used during fractional pixel interpolation, and in some cases, may increase coding gains. This disclosure uses the terms "sub-pixel" "sub-integer pixel" "fractional pixel" and "sub-pel" interchangeably. There are several aspects to this disclosure, including techniques to interpolate a sub-pixel location based on any combination of any number of full-pixel locations, and techniques for selecting support for interpolation filters for sub-pixel positions based on previously encoded frames or current encoding of frames. These and other techniques are described in detail below.

Block based inter-coding is a coding technique that relies on temporal prediction to reduce or remove temporal redundancy between video blocks of successive coded units of a video sequence. The coded units may comprise video frames, slices of video frames, groups of pictures, or another defined unit of encoded video blocks. For inter-coding, a video encoder performs motion estimation and motion compensation to estimate motion between video blocks of two or more adjacent coded units. Using techniques for motion estimation, the video encoder generates motion vectors, which may indicate displacement of video blocks relative to corresponding prediction video blocks in one or more reference frames or other coded units. Using techniques for motion compensation, the video encoder may use the motion vectors to generate prediction video blocks from the one or more reference frames or other coded units. After motion compensation, the video encoder may calculate residual video blocks by subtracting prediction video blocks from the original video blocks being coded.

The video encoder may also apply transform, quantization, and entropy coding processes to further reduce the bit rate associated with communication of residual blocks. Transform techniques may comprise discrete cosine transforms (DCTs) or conceptually similar processes. Alternatively, wavelet transforms, integer transforms, or other types of transforms may be used. In a DCT process, as an example, a set of pixel values may be converted into transform coefficients, which may represent the energy of the pixel values in the frequency domain. The video encoder may also quantize the transform coefficients, which may generally involve a process that reduces the number of bits associated with the corresponding transform coefficient. Entropy coding may include one or more processes that collectively compress data for output to a bitstream, where the compressed data may include, for example, a sequence of coding modes, motion information, coded block patterns, and quantized transform coefficients. Examples of entropy coding include but are not limited to context adaptive variable length coding (CAVLC) and context adaptive binary arithmetic coding (CABAC).

A coded video block may be represented by prediction information that can be used to create or identify a predictive block, and a residual block of data that can be applied to the predictive block to recreate the original block. The prediction information may comprise the one or more motion vectors that are used to identify the predictive block of data. Using the motion vectors, the decoder may be able to reconstruct the predictive blocks that were used to code the residual blocks. Thus, given a set of residual blocks and a set of motion vectors (and possibly some additional syntax), the decoder can reconstruct a video frame that was originally encoded. Inter-coding based on motion estimation and motion compensation can achieve relatively high amounts of compression without excessive data loss, because successive video frames or other types of coded units are often similar. An encoded video sequence may comprise blocks of residual data, motion vectors (when inter-prediction encoded), indications of intra-prediction modes for intra-prediction, and possibly other data, such as types of syntax.

Sub-integer pixel interpolation techniques have been developed in order to improve the prediction accuracy for a level of compression that can be achieved in inter-coding. In this case, the predictive data generated during motion compensation, which is used to code a video block, may correspond to sub-integer pixels, whose values may be interpolated from values for full pixels of video blocks of a reference video frame or other coded unit to which a motion vector refers. The video encoder may calculate values for sub-integer pixel positions using interpolation techniques, e.g., by applying interpolation filters to a set of support, e.g., values for full integer pixels and/or previously coded values of other sub-integer pixel positions. The sub-integer pixel positions may have various degrees of resolution in various examples, such as half-pixel, quarter-pixel, eighth-pixel, sixteenth-pixel, or other resolutions. Accordingly, the video encoder may calculate a motion vector during motion estimation that has sub-pixel precision.

FIG. 1 is a block diagram illustrating one example of a video encoding and decoding system 10 that may be used to implement one or more of the techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, either or both of source device 12 and destination device 16 may comprise wireless communication devices, such as wireless handsets, so-called cellular or satellite radiotelephones, or any wireless devices that can communicate video information over a communication channel 15, in which case communication channel 15 is wireless. The techniques of this disclosure, however, which concern filtering and the generation of predictive data during predictive coding, are not necessarily limited to wireless applications or settings. The techniques may also be useful in a wide range of other settings and devices, including devices that communicate via physical wires, optical fibers or other physical or wireless media. In addition, the encoding or decoding techniques may also be applied in a stand-alone device that does not necessarily communicate with any other device.

In the example of FIG. 1, source device 12 may include a video source 20, video encoder 22, modulator/demodulator (modem) 23 and transmitte 24. Destination device 16 may include a receiver 26, modem 27, video decoder 28, and display device 30. In accordance with this disclosure, video encoder 22 of source device 12 may be configured to apply one or more of the techniques of this disclosure as part of a video encoding process. Similarly, video decoder 28 of destination device 16 may be configured to apply one or more of the techniques of this disclosure as part of a video decoding process.

Again, the illustrated system 10 of FIG. 1 is merely one example. The various techniques of this disclosure may be performed by any encoding device that supports block-based predictive encoding, or by any decoding device that supports block-based predictive decoding. Source device 12 and destination device 16 are merely examples of such coding devices in which source device 12 generates coded video data for transmission to destination device 16. In some cases, devices 12, 16 may operate in a substantially symmetrical manner, such that each of devices 12, 16 include video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and/or computer-generated video. In some cases, if video source 20 is a video camera, source device 12 and destination device 16 may form so-called camera phones or video phones, or other mobile devices configured to manipulate video data, such as tablet computing devices. In each case, the captured, pre-captured or computer-generated video may be encoded by video encoder 22. The encoded video information may then be modulated by modem 23 according to a communication standard, e.g., such as code division multiple access (CDMA) or another communication standard, and transmitted to destination device 16 via transmitte 24 and communication channel 15. Modem 23 may include various mixers, filters, amplifiers or other components designed for signal modulation. Transmitte 24 may include circuits designed for transmitting data, including amplifiers, filters, and one or more antennas.

Receiver 26 of destination device 16 receives information over communication channel 15, and modem 27 demodulates the information. Like transmitte 24, receiver 26 may include circuits designed for receiving data, including amplifiers, filters, and one or more antennas. In some instances, transmitte 24 and/or receiver 26 may be incorporated within a single transceiver component that includes both receive and transmit circuitry. Modem 27 may include various mixers, filters, amplifiers or other components designed for signal demodulation. In some instances, modems 23 and 27 may include components for performing both modulation and demodulation.

Again, the video encoding process performed by video encoder 22 may implement one or more of the techniques described herein during inter-prediction encoding, which may include motion estimation and motion compensation. The video decoding process performed by video decoder 28 may also perform such techniques during a motion compensation stage of the decoding process. The term "coder" is used herein to refer to a specialized computer device or apparatus that performs video encoding or video decoding. The term "coder" generally refers to any video encoder, video decoder, or combined encoder/decoder (codec). The term "coding" refers to encoding or decoding. Display device 30 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16.

Video encoder 22 and video decoder 28 may operate according to a video compression standard, such as the ITU-T H.264 standard, alternatively described as MPEG-4, Part 10, Advanced Video Coding (AVC). The techniques of this disclosure, however, are not limited to any particular video coding standard. Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. When any or all of the techniques of this disclosure are implemented in software, an implementing device may further include hardware for storing and/or executing instructions for the software, e.g., a memory for storing the instructions and one or more processing units for executing the instructions. Each of video encoder 22 and video decoder 28 may be included in one or more encoders or decoders, either of which may be integrated as part of a combined codec that provides encoding and decoding capabilities in a respective mobile device, subscriber device, broadcast device, server, or the like.

A video sequence typically includes a series of video frames, also referred to as video pictures. Video encoder 22 operates on video blocks within individual video frames in order to encode the video data. The video blocks may have fixed or varying sizes, and may differ in size according to a specified coding standard. Each video frame includes a series of slices. In the ITU-T H.264 standard, for example, each slice may include a series of macroblocks, which may be arranged into sub-blocks. The H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform (DCT) or a conceptually similar transformation process.

Smaller video blocks can provide better resolution, and may be used for locations of a video frame that include high levels of detail. In general, macroblocks and the various sub-blocks may be considered to be video blocks. In addition, a slice may be considered to be a series of video blocks, such as macroblocks and/or sub-blocks. Each slice may be an independently decodable unit of a video frame. Alternatively, frames themselves may be decodable units, or other portions of a frame may be defined as decodable units. The term "coded unit" refers to any independently decodable unit of a video frame such as an entire frame, a slice of a frame, a block of video data, or another independently decodable unit defined according to the coding techniques used.

To encode the video blocks, video encoder 22 performs intra- or inter-prediction to generate a prediction block. Video encoder 22 subtracts the prediction blocks from the original video blocks to be encoded to generate residual blocks. Thus, the residual blocks may represent pixel-by-pixel differences between the blocks being coded and the prediction blocks. Video encoder 22 may perform a transform on the residual blocks to generate blocks of transform coefficients. Following intra- or inter-based predictive coding and transformation techniques, video encoder 22 may quantize the transform coefficients. Quantization generally refers to a process in which coefficients are quantized to possibly reduce the amount of data used to represent the coefficients. Following quantization, entropy coding may be performed according to an entropy coding methodology, such as context adaptive variable length coding (CAVLC) or context adaptive binary arithmetic coding (CABAC). Additional details of an encoding process performed by video encoder 22 are described below with respect to FIG. 2.

Efforts are currently in progress to develop a new video coding standard, currently referred to as High Efficiency Video Coding (HEVC). The upcoming standard is also referred to as H.265. The standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-three intra-prediction encoding modes.

HM refers to a block of video data as a coding unit (CU). Syntax data within a bitstream may define a largest coding unit (LCU), which is a largest coding unit in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be split into sub-CUs. Syntax data for a bitstream may define a maximum number of times an LCU may be split, referred to as CU depth. Accordingly, a bitstream may also define a smallest coding unit (SCU). This disclosure also uses the term "block" to refer to any of a CU, prediction unit (PU), or transform unit (TU).

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the CU defining the PU(s) may also describe, for example, partitioning of the CU into one or more PUs. Partitioning modes may differ between whether the CU is uncoded, intra-prediction mode encoded, or inter-prediction mode encoded.

A CU having one or more PUs may also include one or more transform units (TUs). Following prediction using a PU, a video encoder may calculate a residual value for the portion of the CU corresponding to the PU. The residual value may be transformed, scanned, and quantized. A TU is not necessarily limited to the size of a PU. Thus, TUs may be larger or smaller than corresponding PUs for the same CU. In some examples, the maximum size of a TU may correspond to the size of the corresponding CU.

As noted above, intra-prediction includes predicting a PU of a current CU of a picture from previously coded CUs of the same picture. More specifically, a video encoder may intra-predict a current CU of a picture using a particular intra-prediction mode. An HM encoder may be configured with up to thirty-three intra-prediction modes. Therefore, to support a one-to-one mapping between directional intra-prediction modes and directional transforms, HM encoders and decoders would need to store 66 matrices for each supported transform size. Furthermore, the block sizes for which all thirty-three intra-prediction modes are supported may be relatively large blocks, e.g., 32×32 pixels, 64×64 pixels, or even larger.

In destination device 16, video decoder 28 receives the encoded video data. Video decoder 28 entropy decodes the received video data according to an entropy coding methodology, such as CAVLC or CABAC, to obtain the quantized coefficients. Video decoder 28 applies inverse quantization (de-quantization) and inverse transform functions to reconstruct the residual block in the pixel domain. Video decoder 28 also generates a prediction block based on control information or syntax information (e.g., coding mode, motion vectors, syntax that defines filter coefficients and the like) included in the encoded video data. Video decoder 28 may calculate a sum of the prediction block and the reconstructed residual block to produce a reconstructed video block for display. Additional details of an example decoding process performed by video decoder 28 are described below with respect to FIG. 10.

As described herein, Y may represent luminance, and Cb and Cr may represent two different values of chrominance of a three-dimensional YCbCr color space. Each pixel location may actually define three pixel values for a three-dimensional color space. The techniques of this disclosure, however, may refer to prediction with respect to one dimension for purposes of simplicity. To the extent that techniques are described with respect to pixel values in one dimension, similar techniques may be extended to the other dimensions.

According to the techniques of this disclosure, video encoder 22 and video decoder 28 may use the one or more interpolation filtering techniques during motion compensation. In particular, in accordance with one aspect of this disclosure, video encoder 22 and/or video decoder 28 may obtain a block of pixels, wherein the block of pixels includes integer pixel values corresponding to integer pixel positions within the block of pixels. Video encoder 22 and/or video decoder 28 may compute values for sub-pixel positions associated with the block of pixels based on the integer pixel values, wherein computing the sub-pixel values comprises applying an interpolation filter to various sets of filter support, where each of the sets of filter support corresponds to a set of one or more integer pixel positions in the block of pixels. Video encoder 22 and/or video decoder 28 may also generate a prediction block based on at least some of the sub-pixel values to encode or decode a block of pixels.

In accordance with an aspect of this disclosure, video encoder 22 and/or video decoder 28 may apply an interpolation filter to filter support comprising any combination of full integer pixel positions. Video encoder 22 may determine a plurality of sets of filter coefficients for a number of (e.g., fifteen) different sub-pixel positions associated with a full integer pixel position and output the fifteen sets of filter coefficients to another device as part of an encoded bitstream. In this way, the plurality of sets of filter coefficients may define all the filter coefficients for all fifteen half-pixel and quarter-pixel positions. In some examples, the sets of filter coefficients for each half-pixel and quarter-pixel associated with the full integer pixel position may be unique. In other examples, some or all of the sets of filter coefficients for the half-pels and quarter-pels associated with the full integer pixel position may be the same.

Video decoder 28 of destination device 16 may receive the one or more sets of filter coefficients as part of an encoded video bitstream and generate fifteen sets of filter coefficients corresponding to the fifteen different sub-pixel positions based on the one or more sets of filter coefficients. Video decoder 28 may also generate sub-pel values for video decoding based on one of the plurality of sets of filter coefficients, wherein the interpolated predictive data corresponds to one of the fifteen different sub-pixel positions, and decode one or more video blocks based on the interpolated predictive data.

In accordance with another aspect of this disclosure, video encoder 22 may receive values for a plurality of full integer pixel positions of a reference sample, apply an interpolation filter to a first set of the values for the plurality of full integer pixel positions to calculate a value for a first sub-integer pixel of one of the plurality of full integer pixel positions, apply the same interpolation filter to a second, different set of the values for the plurality of full integer pixel positions to calculate a value for a second, different sub-integer pixel of the one of the full integer pixel positions, and encode a current block of pixels using a motion vector that points to one of the first sub-integer pixel and the second sub-integer pixel. In some examples, the interpolation filter is a first interpolation filter, and video encoder 22 may further apply a second, different interpolation filter to a third set of values for the plurality of full integer pixel positions to calculate a value for a third sub-integer pixel of one of the plurality of full integer pixel positions. In other examples, additional filters or sets of values for the plurality of full integer pixel positions are used to calculate additional values for sub-integer pixel positions.

Video encoder 22 may provide an indication of the interpolation filter used to calculate the value for the first sub-integer pixel. The indication may comprise an explicit indication of the support. Alternatively, the indication may correspond to an index or other identifier, when video encoder 22 and video decoder 28 are pre-configured with sets of support. The indication may be provided in one of a prediction unit level, a coding unit level, a frame level, a slice level, or a sequence level, wherein each level is related to the current block of pixels. In some examples, the indication may be provided in a sequence parameter set (SPS) or picture parameter set (PPS). Video encoder 22 may output the indication to another device as part of an encoded bitstream. In some examples, the interpolation filter is an ITU-T H.264 interpolation filter, a fixed interpolation filter (e.g., selected from a set of interpolation filters), or an adaptive interpolation filter. Moreover, video encoder 22 may provide indications of support for each of the sub-integer pixels of a full pixel using techniques similar to those described above.

The interpolation filter may be a separable filter or a non-separable filter. A non-separable filter is an interpolation filter in which the filter support may be modified to directly generate a sub-pel without performing an intermediate filtering step. In contrast, a separable filter is one in which filtering may depend on another filtering step. For example, in bilinear filtering, a filter may be first applied in a horizontal direction to generate a value for a first sub-pel location. Then, the filter may be transposed and applied across the first sub-pel location in a vertical direction to generate a value for a second sub-pel location.

In another example, a method may comprise receiving a reference sample comprising a plurality of full pixel positions, receiving an indication of a set of the full integer pixel positions of the reference sample used to interpolate a value for a sub-integer pixel of the reference sample, applying an interpolation filter to the set of the full integer pixel positions to calculate the value of the sub-integer pixel of the reference sample, and decoding a current block of pixels relative to the calculated value of the sub-integer pixel.

Figure 2:
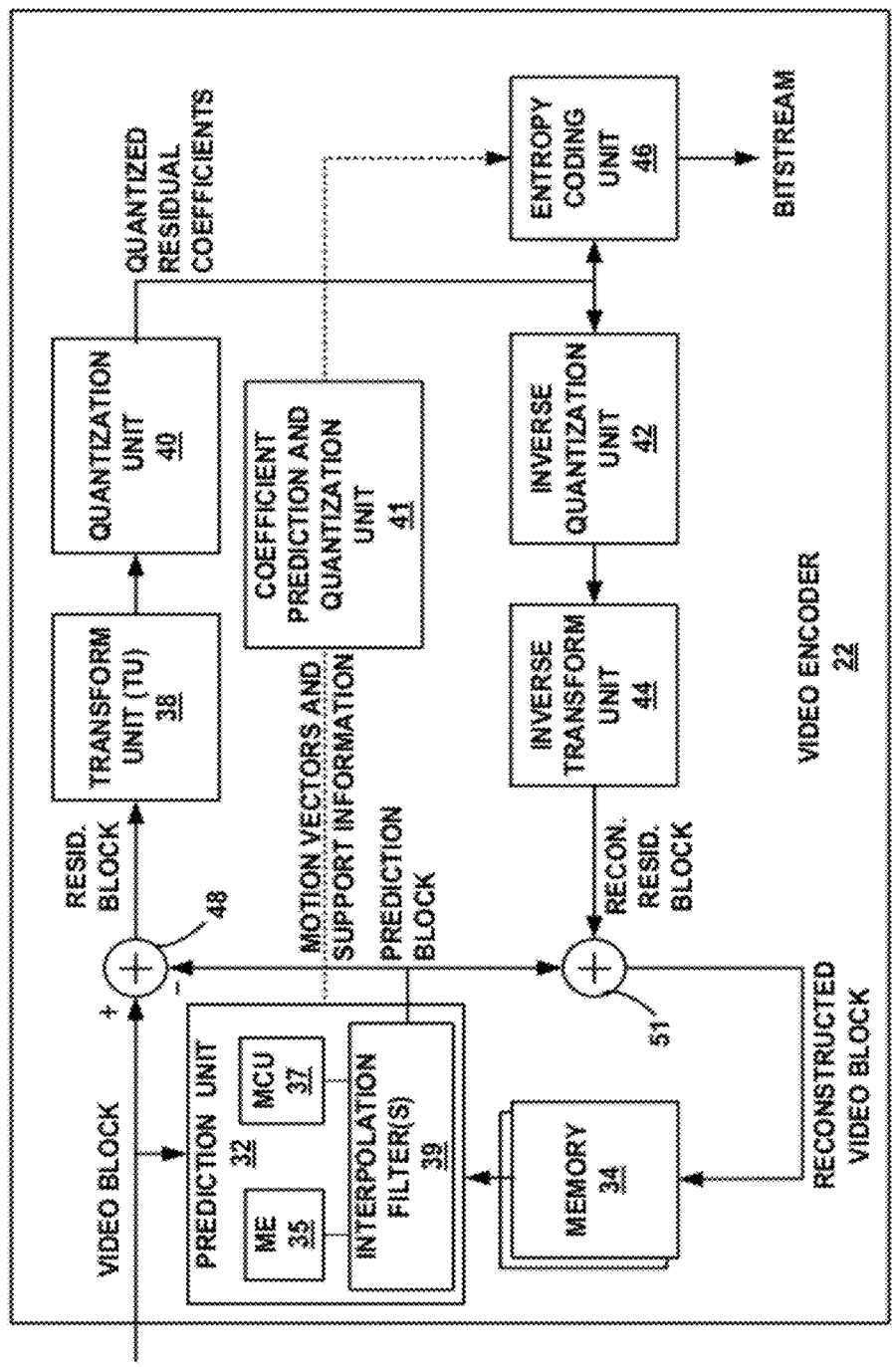
FIG. 2 is a block diagram illustrating an example of the video encoder of FIG. 1 in further detail.

FIG. 2 is a block diagram illustrating an example of the video encoder 22 of FIG. 1 in further detail. The video encoder 22 that may perform inter-prediction techniques consistent with this disclosure. Video encoder 22 is one example of a specialized video computer device or apparatus referred to herein as a "coder." As shown in FIG. 2, video encoder 22 corresponds to video encoder 22 of device 20. However, in other examples, video encoder 22 may correspond to a different device. In further examples, other units (such as, for example, other encoder/decoder (CODECS)) can also perform similar techniques as video encoder 22.

Video encoder 22 may perform intra- and inter-coding of blocks within video frames, although intra-coding components are not shown in FIG. 2 for ease of illustration. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to the spatial-based compression mode. Inter-modes such as a prediction (P-mode) or a bi-directional (B-mode) may refer to the temporal based compression modes. The techniques of this disclosure apply during inter-coding, and therefore, intra-coding units such as a spatial prediction unit are not illustrated in FIG. 2 for simplicity and ease of illustration.

As shown in FIG. 2, video encoder 22 receives a video block within a video frame to be encoded. In the example of FIG. 2, video encoder 22 includes a prediction coding unit (MCU) 32, memory 34, an adder 48, a transform unit 38, a quantization unit 40, and an entropy coding unit 46. For video block reconstruction, video encoder 22 also includes an inverse quantization unit 42, an inverse transform unit 44, and an adder 51. In some examples, a deblocking filter may also be included to filter block boundaries to remove blockiness artifacts from reconstructed video. If desired, the deblocking filter would typically filter the output of adder 51. In one example, as shown in FIG. 2, transform unit 38 may be a functional block, not a "TU" in terms of HEVC.

Prediction unit 32 may include a motion estimation (ME) unit 35 and a motion compensation (MC) unit 37. One or more interpolation filters 39 (referred to herein as "filter 39") may be included in prediction unit 32 and may be invoked by one or both of ME unit 35 and MC unit 37 to perform interpolation as part of motion estimation and/or motion compensation, according to this disclosure. Other techniques may be included in which a value for a sub-pixel is calculated based on values for neighboring full-pixels and/or previously calculated values for neighboring sub-pixels. Filter 39 may actually represent a plurality of different filters to facilitate numerous different types of interpolation and interpolation-type filtering as described herein. Thus, prediction unit 32 may include a plurality of interpolation or interpolation-like filters. During the encoding process, video encoder 22 receives a video block to be coded (labeled "VIDEO BLOCK" in FIG. 2), and prediction unit 32 performs inter-prediction coding to generate a prediction block (labeled "PREDICTION BLOCK" in FIG. 2). Specifically, ME unit 35 may perform motion estimation to identify the prediction block in memory 34, and MC unit 37 may perform motion compensation to generate the prediction block.

Motion estimation is typically considered the process of generating motion vectors, which estimate motion for video blocks. A motion vector, for example, may indicate the displacement of a prediction block within a prediction or reference frame (or other coded unit, e.g., slice) relative to the block to be coded within the current frame (or other coded unit). In accordance with the techniques of this disclosure, the motion vector may have sub-integer pixel precision. For example, both a horizontal component and a vertical component of the motion vector may have respective full integer components and sub-integer components. The reference frame (or portion of the frame) may be temporally located prior to or after the video frame (or portion of the video frame) to which the current video block belongs. Motion compensation is typically considered the process of fetching or generating the prediction block from memory 34, which may include interpolating or otherwise generating the predictive data based on the motion vector determined by motion estimation.

ME unit 35 calculates the motion vector for the video block to be coded by comparing the video block to reference blocks of one or more reference frames (e.g., a previous and/or subsequent frame). Data for the reference frames may be stored in memory 34. ME unit 35 may perform motion estimation with fractional pixel precision, sometimes referred to as fractional pixel, fractional pel, sub-integer, or sub-pixel motion estimation. As such, the terms fractional pixel, fractional pel, sub-integer, and sub-pixel motion estimation may be used interchangeably. In fractional pixel motion estimation, ME unit 35 may calculate a motion vector that indicates displacement to a location other than an integer pixel location. Thus, the motion vector may have fractional pixel precision, e.g., one-half-pixel precision, one-quarter-pixel precision, one-eighth pixel precision, or other fractional pixel precisions. In this manner, fractional pixel motion estimation allows prediction unit 32 to estimate motion with higher precision than integer-pixel (or full-pixel) locations, and thus, prediction unit 32 may generate a more accurate prediction block. Fractional pixel motion estimation may have half-pixel precision, quarter-pixel precision, eighth-pixel precision, or any finer sub-pixel precision. ME unit 35 may invoke filter(s) 39 for any necessary interpolations during the motion estimation process. In some examples, memory 34 may store interpolated values for sub-integer pixels, which may be calculated by, e.g., summer 51 using filter(s) 39. For example, summer 51 may apply filter(s) 39 to reconstructed blocks that are to be stored in memory 34.

To perform fractional pixel motion compensation, MC unit 37 may perform interpolation (sometimes referred to as interpolation filtering) in order to generate data at sub-pixel resolution (referred to herein as sub-pixel or fractional pixel values). MC unit 37 may invoke filter(s) 39 for this interpolation. Prediction unit 32 may perform the interpolation (or interpolation-like filtering of integer pixels) using the techniques described herein. In this manner, prediction unit 32 may calculate values for sub-integer pixel positions of a reference block, which may then be used to produce a predictive block of video data.

Once the motion vector for the video block to be coded is calculated by ME unit 35, MC unit 37 generates the prediction video block associated with that motion vector. MC unit 37 may fetch the prediction block from memory 34 based on the motion vector determined by MC unit 35. In the case of a motion vector with fractional pixel precision, MC unit 37 may filter data from memory 34 to interpolate such data to sub-pixel resolution, e.g., invoking filter(s) 39 for this process. In some cases, the full-integer pixel positions corresponding to the filter coefficients used to interpolate such data to sub-pixel resolution may be indicated as one or more interpolation syntax elements to entropy coding unit 46 for inclusion in the coded bitstream. Similarly, the interpolation filtering technique or mode that was used to generate the sub-pixel prediction data may also be indicated as one or more interpolation syntax elements to entropy coding unit 46 for inclusion in the coded bitstream.

Once prediction unit 32 has generated the prediction block, video encoder 22 forms a residual video block (labeled "RESID. BLOCK" in FIG. 2) by subtracting the prediction block from the original video block being coded. Adder 48 represents the component or components that perform this subtraction operation. Transform unit 38 applies a transform, such as a discrete cosine transform (DCT) or a conceptually similar transform, to the residual block, producing a video block comprising residual transform block coefficients. Transform unit 38, for example, may perform other transforms, such as those defined by the H.264 standard, which are conceptually similar to DCT. Such transforms may include, for example, directional transforms (such as Karhunen-Loeve theorem transforms), wavelet transforms, integer transforms, sub-band transforms, or other types of transforms. In any case, transform unit 38 applies the transform to the residual block, producing a block of residual transform coefficients. The transform may convert the residual information from a pixel domain to a frequency domain.

Quantization unit 40 quantizes the residual transform coefficients to further reduce bit rate. The quantization process may reduce the bit depth associated with some or all of the coefficients. Following quantization, entropy coding unit 46 entropy codes the quantized transform coefficients. For example, entropy coding unit 46 may perform CAVLC, CABAC, or another entropy coding methodology.

Entropy coding unit 46 may also code one or more motion vectors and support information obtained from prediction unit 32 or other component of video encoder 22. The one or more prediction syntax elements may include a coding mode, data for one or more motion vectors (e.g., horizontal and vertical components, reference list identifiers, list indexes, and/or motion vector resolution signaling information), an indication of an interpolation technique that was used to generate the sub-pixel data, a set or subset of filter coefficients, a set of full- or sub-integer pixel positions used as filter support, or other information associated with the generation of the prediction block. Following the entropy coding by entropy coding unit 46, the encoded video and syntax elements may be transmitted to another device or archived (for example, in memory 34) for later transmission or retrieval.

Inverse quantization unit 42 and inverse transform unit 44 apply inverse quantization and inverse transformation, respectively, to reconstruct the residual block in the pixel domain, e.g., for later use as a reference block. The reconstructed residual block (labeled "RECON. RESID. BLOCK" in FIG. 2) may represent a reconstructed version of the residual block provided to transform unit 38. The reconstructed residual block may differ from the residual block generated by summer 48 due to loss of detail caused by the quantization and inverse quantization operations. Summer 51 adds the reconstructed residual block to the motion compensated prediction block produced by prediction unit 32 to produce a reconstructed video block for storage in memory 34. The reconstructed video block may be used by prediction unit 32 as a reference block that may be used to subsequently code a block in a subsequent video frame or subsequent coded unit.

As described above, prediction unit 32 may perform motion estimation with fractional pixel (or sub-pixel) precision. When prediction unit 32 uses fractional pixel motion estimation, prediction unit 32 may generate data at sub-pixel resolution (e.g., sub-pixel or fractional pixel values) using interpolation operations described in this disclosure. In other words, the interpolation operations may be used to compute values at positions between the integer pixel positions. Sub-pixel positions located half the distance between integer-pixel positions may be referred to as half-pixel (half-pel) positions, sub-pixel positions located half the distance between an integer-pixel position and a half-pixel position may be referred to as quarter-pixel (quarter-pel) positions, sub-pixel positions located half the distance between an integer-pixel position (or half-pixel position) and a quarter-pixel position are referred to as eighth-pixel (eighth-pel) positions, and the like.

In accordance with the techniques of this disclosure, the same one of interpolation filters 39 may be applied to two or more different sets of support, to calculate values for two sub-integer pixels of the same full pixel. As described in greater detail below, prediction unit 32, for example, may apply one of filters 39 to a first set of support to calculate a value for a first sub-integer pixel of a full pixel, and apply the same interpolation filter to a second, different set of support to calculate a value for a second sub-integer pixel of the same full pixel. Moreover, the sets of support may have various shapes, e.g., linear (horizontal, vertical, diagonal sloping from upper-left to lower-right, diagonal sloping from upper-right to lower-left, and the like), an X-shape crossing at the full pixel, circular (e.g., pixels in a circular shape about the full pixel), matrix (e.g., two or more pixels in multiple rows of full pixels), or other shapes.

In this manner, video encoder 22 represents an example of a video encoder configured to receive values for a plurality of full integer pixel positions of a reference sample, apply an interpolation filter to a first set of the values for the plurality of full integer pixel positions to calculate a value for a first sub-integer pixel of one of the plurality of full integer pixel positions, apply the same interpolation filter to a second, different set of the values for the plurality of full integer pixel positions to calculate a value for a second, different sub-integer pixel of the one of the full integer pixel positions, encode a current block of pixels using a motion vector that points to one of the first sub-integer pixel and the second sub-integer pixel.

Figure 3:
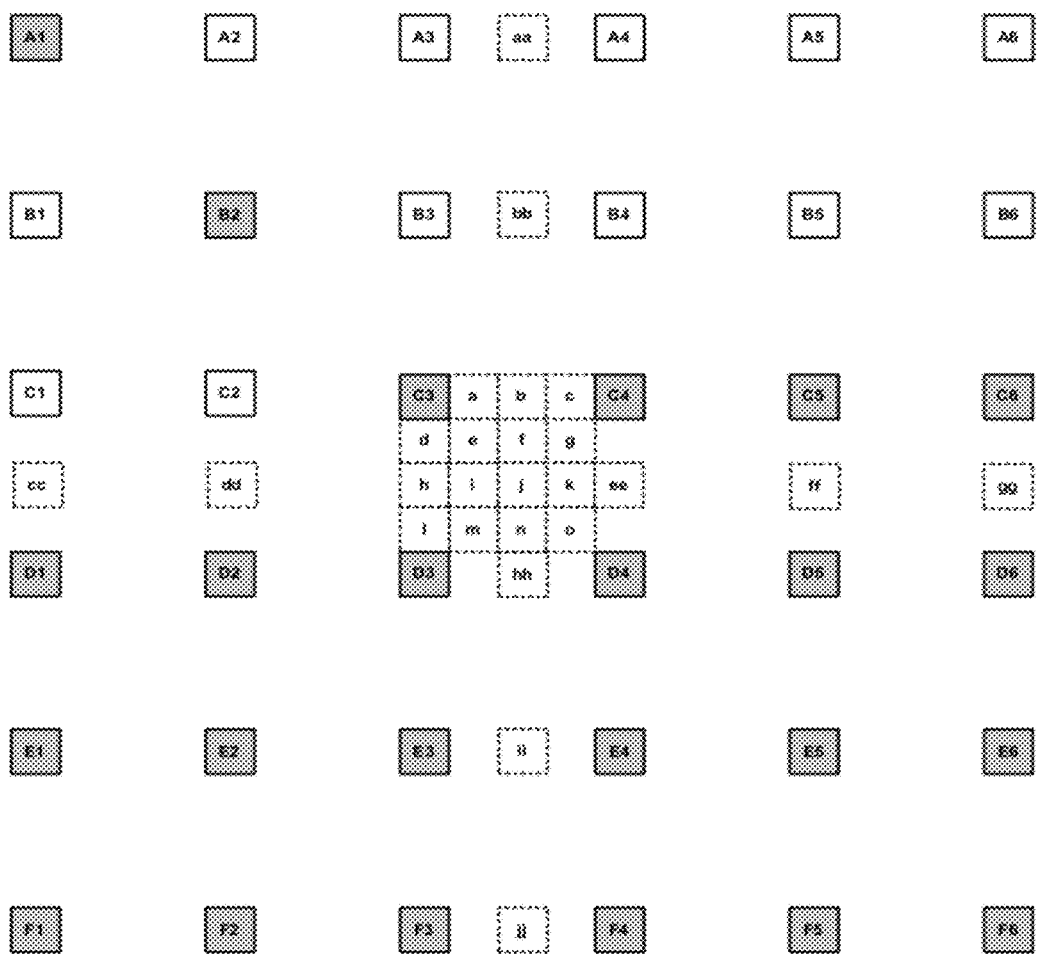
FIG. 3 is a conceptual diagram illustrating an example of integer-pixel positions associated with prediction data, and sub-pixel positions associated with interpolated prediction data.

FIG. 3 is a conceptual diagram illustrating integer pixel (or full pixel) positions associated with prediction data, and sub-pixel (or fractional-pixel) positions associated with interpolated prediction data. In the conceptual illustration of FIG. 3, the different boxes represent pixel and sub-pixel positions within a frame or a block of a frame. Capitalized letters with numbers (in the boxes with solid lines) represent integer-pixel locations, while small letters (in the boxes with dotted lines) represent the sub-pixel positions. In particular, pixel locations A1-A6, B1-B6, C1-C6, D1-D6, E1-E6, and F1-F6 represent a 6-by-6 array of integer pixel locations within a frame, slice, or other coded unit. Sub-pixel positions "a" through "o" represent fifteen sub-pixel positions associated with integer pixel C3, e.g., between integer pixel locations C3, C4, D3, and D4. Similar sub-pixel positions may exist for every integer pixel location. The sub-pixel positions "a" through "o" represent the half-pel and quarter-pel pixel positions associated with integer pixel C3. As described in greater detail below, the same interpolation filter may be used to calculate values for two or more of sub-pixels a-o, e.g., by applying the same interpolation filter to different sets of support.

Integer-pixel locations may be associated with a physical sensor element, such as a photodiode when the video data was originally generated. The photodiode may measure an intensity of a light source at the location of the sensor and associate a pixel intensity value with the integer-pixel location. Again, each integer-pixel location may have an associated set of fifteen sub-pixel positions (or possibly more or less). The number of sub-pixel positions associated with integer-pixel locations may be dependent upon the desired precision. In the example illustrated in FIG. 3, the desired precision is quarter-pixel precision, in which case, each of the integer pixel locations related to fifteen different sub-pixel positions. More or fewer sub-pixel positions may be associated with each integer-pixel location based on the desired precision. For half-pixel precision, for example, each integer-pixel location may correspond to three sub-pixel positions. As another example, each of the integer-pixel locations may correspond to sixty-three sub-pixel positions for eighth-pixel precision. Each pixel location may define one or more pixel values, e.g., one or more luminance and chrominance values.

In the example of FIG. 3, sub-pixel positions associated with integer pixel "C3" are illustrated for quarter-pixel precision. The fifteen sub-pixel positions associated with pixel C3 are labeled as "a," "b," "c," "d," "e," "f," "g," "h," "i," "j," "k," "l," "m," "n," and "o." Most of the other fractional locations associated with other integer-pixel locations are not shown for simplicity (other than those used to generate one or more of the 15 different fractional locations associated with pixel location C3, as described in further detail below). Sub-pixel positions "b," "h" and "j" may be referred to as half-pixel locations and sub-pixel positions "a," "c," "d," "e," "f," "g," "i," "k," "l," "m," "n," and "o" may be referred to as quarter-pixel locations.

Prediction unit 32 of video encoder 40 may determine pixel values for sub-pixel positions "a" through "o" using interpolation filtering by MC unit 37. Prediction unit 32 may determine pixel values for sub-pixel positions "a" through "o" using a 36-tap interpolation filter. Prediction unit 32 may apply the interpolation filter to all 36 full-integer pixel positions for each of the sub-pixel positions. In other examples, subsets of the full-integer pixel positions are used as filter support to interpolate values for the sub-pixel positions.

In one example, prediction unit 32 of video encoder 40 may determine pixel values for sub-pixel positions "a" through "o" using interpolation filtering by MCU 37 using an interpolation filter consistent with the ITU-T H.264 standard. Consistent with the ITU-T H.264 standard, for example, prediction unit 32 may determine pixel values for half-pixel locations using a 6-tap interpolation filter, such as a Wiener filter. In the case of the H.264 standard, the filter coefficients for the 6-tap interpolation filter are typically [1, −5, 20, 20, −5, 1], although other coefficients may be used. Prediction unit 32 may apply the interpolation filter to any set of six full integer pixel positions. In one example, for half-pixel position "b," the taps of the 6-tap filter may correspond to B3, B4, C3, C4, D3, and D4. In other examples, the taps of the 6-tap filter for half-pixel position "b" may be another set of six full integer pixel positions. Likewise, in one example, for half-pixel position "h," the taps of the 6-tap filter may correspond to C2, C3, C4, D2, D3, and D4. For example, pixel values for sub-pixel position "j" may be computed using equations (1) or (2):

$$j=((A1-5*B2+20*C3+20*D4-5*E5+F6)+16)/32 \qquad (1)$$

$$j=((A6-5*B5+20*C4+20*D3-5*E2+F1)+16)/32 \qquad (2)$$

Equations 1 and 2 shown above illustrate one example of how the values of the full integer pixel positions may be associated with the different coefficients of the 6-tap filter. In other examples, the values of the full integer pixel positions may correspond to different coefficients of the 6-tap filter. In one example, full integer pixel positions in the filter support for a sub-pixel position that are closest to the sub-pixel position are given higher weighted coefficients in the filter, while full integer pixel positions further from the sub-pixel position are given lower weight. In other examples, other methods for determining which full integer pixel position corresponds to which coefficients are used.

Different sub-pels of the same full-pel may be calculated using different support. For example, while some sub-pixel positions (such as "b" and "h" associated with full-pixel position C3, described above) may be calculated with the same or different subsets of full integer pixel positions, a sub-pixel location may be determined based on other sub-pixel positions. For example, half-pixel position "j," also associated with full-pixel location C3, may be calculated using a bilinear interpolation filter that depends on sub-pixel positions. For half-pixel position "j," the taps of the 6-tap filter correspond themselves to interpolated horizontally between positions C1–C6 and D1–D6, or vertically between positions A3–F3 and A4–F4. Half-pixel location "j" may be computed with a 6-tap filter that uses previously interpolated pixel values of the half-pixel positions, e.g., in accordance with one of equations (3) or (4):

$$j=((aa-5*bb+20*b+20*hh-5*ii+jj)+16)/32 \quad (3)$$

$$j=((cc-5*dd+20*h+20*ee-5*ff+gg)+16)/32 \quad (4)$$

where (as illustrated in FIG. 3) aa corresponds to an interpolation between A3 and A4, bb corresponds to an interpolation between B3 and B4, b corresponds to an interpolation between C3 and C4, hh corresponds to an interpolation between D3 and D4, ii corresponds to an interpolation between E3 and E4 and jj corresponds to an interpolation between F3 and F4. In equation 4, cc corresponds to an interpolation between C1 and D1, dd corresponds to an interpolation between C2 and D2, h corresponds to an interpolation between C3 and D3, ee corresponds to an interpolation between C4 and D4, ff corresponds to an interpolation between C5 and D5 and gg corresponds to an interpolation between C6 and D6.

Consistent with the H.264 standard, prediction unit 32 may determine some pixel values at quarter-pixel locations "a," "c," "d," "e," "f," "g," "i," "k," "l," "m," "n" and "o" using a bilinear interpolation filter and the pixel values of the surrounding integer- and half-pixel locations. For example, prediction unit 32 may determine a pixel value associated with sub-pixel position "a" using pixel values of C3 and "b," determine a pixel value associated with sub-pixel position "c" using pixel values of "b" and C4, and the like.

The actual filter that is applied by MC unit 37 to generate interpolated data at the sub-pixel positions may be subject to a wide variety of implementations. As one example, prediction unit 32 may use adaptive interpolation filtering (AIF), as described below, to define the interpolated values. The ITU-T SG16/Q.6/VCEG (Video Coding Expert Group) committee has been exploring coding technologies that offer higher coding efficiency than H.264 and, in particular, AIF. AIF offers large coding gain over the interpolation filtering used in the H.264 standard, especially on video sequences with high resolution (e.g., 720i/p or 1080i/p). In AIF, the interpolation filter for each sub-pixel position is analytically calculated for each video frame by minimizing the prediction error energy. This helps to address aliasing, quantization and motion estimation errors, camera noise or other artifacts contained in the original and reference video frames. The analytically derived adaptive filter coefficients for each frame may then be predicted, quantized, coded and sent in the video bitstream. Some of the techniques of this disclosure could work within an AIF scheme, as well as many other interpolation schemes.

There are many different types of AIF schemes consistent with aspects of this disclosure. For example a first scheme is a two-dimensional non-separable AIF (NS-AIF), a second is a separable AIF (S-AIF), and a third is an AIF with directional filters (D-AIF). Although each of these AIF schemes use different interpolation techniques and support, all three AIF schemes may use similar analytical processes to derive the filter coefficients, which is explained below using non-separable AIF as an example. Any of these AIF schemes may be used with different full-integer pixel positions for any given sub-pixel position.

Assume a 6-by-6 two-dimensional non-separable filter has coefficients $h_{i,j}^{SP}$ where i,j=0 ... 5 and SP represents one of the 15 sub-pixel positions ("a" through "o") shown in FIG. 3. Note that 6 of the 15 sub-pixel positions, i.e., "a," "b," "c," "d," "h" and "l," are one-dimensional (1D) sub-pixel positions, and prediction unit 32 may use a 6-tap interpolation filter to interpolate such data. Sub-pixel positions "a," "b," "c," "d," "h" and "l," are 1D in the sense that they are located in a horizontal or vertical line between two integer-pixel positions. Also, assume that the prediction pixels at the integer-pixel positions (A1 through F6 in FIG. 3) in the reference frame take the pixel values of $P_{i,j}$ where i,j=0 ... 5. That is, A1 takes the value of $P_{0,0}$, ..., A6 takes the value of $P_{5,0}$, ..., F1 takes the value of $P_{5,0}$, ..., and F6 takes the value of $P_{5,5}$. The the interpolated value $p^{SP}$ at sub-pixel position SP, SP ∈ {a, ..., o} $_5$ may be calculated by prediction unit 32 using the following equation $$p^{SP} = \sum_{i=0}^{5} \sum_{j=0}^{5} P_{i,j} h_{i,j}^{SP}. \quad (5)$$

Let $S_{x,y}$ be the pixel value in the current video frame at position (x, y).

$$\tilde{x}=x+\lfloor mvx \rfloor-FO, \ \tilde{y}=y+\lfloor mvy \rfloor-FO,$$

where (mvx, mvy) is the motion vector, ($\lfloor mvx \rfloor, \lfloor mvy \rfloor$) is the integer component of the motion vector, and FO is the filter offset. The value ($\tilde{x}, \tilde{y}$) is the corresponding pixel position in the reference frames. For example, in the case of 6-tap filter, FO=6/2−1=2. For each sub-pixel position SP, the prediction error energy ($e^{SP}$)$^2$ between the actual pixel value in the current frame and the interpolated value can be accumulated by prediction unit 32 for all pixels that have motion vector precision corresponding to sub-pixel position SP. The prediction error energy ($e^{SP}$)$^2$ may be calculated by prediction unit 32 using the following equation:

$$(e^{SP})^2 = \sum_{x} \sum_{y} (S_{x,y} - p_{x,y}^{SP})^2 = \sum_{x} \sum_{y} \left( S_{x,y} - \sum_{i=0}^{5} \sum_{j=0}^{5} h_{i,j}^{SP} P_{\tilde{x}+i, \tilde{y}+j} \right)^2 \quad (6)$$

For each of the sub-pixel positions a through o, MC unit 37 may set up an individual set of equations by computing the derivative of ($e^{SP}$)$^2$ with respect to the filter coefficients $h_{i,j}^{SP}$. The number of equations, in this case, is equal to the number of filter coefficients used for the current sub-pixel position SP. For each sub-pixel position, prediction unit 32 may use a 6-by-6 tap 1D interpolation filter (e.g., 1D 6-tap filter). In other examples, prediction unit 32 may use different tap interpolation filters (e.g., a 1D 12-tap filter). In the case of a 1D 6-tap filter, a system of six equations can be solved by MC unit 37.

$$0 = \frac{(\partial e^{SP})^2}{\partial h_{k,l}^{SP}} \tag{7}$$

$$= \frac{\partial}{\partial h_{k,l}^{SP}} \left( \sum_x \sum_y \left( S_{x,y} - \sum_i \sum_j h_{i,j}^{SP} P_{\tilde{x}+i, \tilde{y}+j} \right)^2 \right)$$

$$= \sum_x \sum_y \left( S_{x,y} - \sum_i \sum_j h_{i,j}^{SP} P_{\tilde{x}+i, \tilde{y}+j} \right) P_{\tilde{x}+k, \tilde{y}+l}$$

$$\forall k, l \in \{0; 5\}$$

Filter(s) 39 may represent one filter or a set of many different filters that may be used by MC unit 37 to generate the predictive data.

Thus, one example process of deriving and applying the AIF filters may have the following steps, which can be performed by prediction unit 32:

1. Estimate motion vectors (mvx, mvy) for every video block to be coded. During motion estimation, a fixed interpolation filter (e.g., the interpolation process of H.264/AVC) can be applied.
2. Using these motion vectors, accumulate prediction error energy for each sub-pixel position SP over the current video frame. Then, calculate adaptive filter coefficients $h_{i,j}^{SP}$ for each sub-pixel position SP independently by minimizing the prediction error energy as in the two prediction energy equations above.
3. Estimate new motion vectors. During this motion estimation process, the adaptive interpolation filters computed in step 2 may be applied. Using the adaptive interpolation filters, motion estimation errors (caused by aliasing, camera noise, etc.) may be reduced and better motion prediction is achieved.

Different AIF schemes may use the same analytical process as given above. The differences between the different schemes mostly lie in the number of unique filter coefficients used, whether the interpolation filters are separable or non-separable, and the filter support used (such as integer pixel positions used to interpolate at least a portion of the sub-pixel positions). In each of these schemes, different sets of full-integer pixel positions may be used for different sub-pixel positions.

For NS-AIF, for example, MC unit 37 of prediction unit 32 may interpolate 1D sub-pixel positions "a," "b," "c," "d," "h," and "l" using a 1D 6-tap interpopulation filter (also referred to as a 6-position filter as each tap corresponds with a integer-pixel position), which requires six coefficients. The six coefficients of the 6-position filters used to interpolate the sub-pixels each correspond to one of the integer-pixel positions illustrated in FIG. 3. For example, for sub-pixel positions "a," the six integer-pixel positions corresponding to the coefficients may be C1, C2, C3, C4, C5 and C6. In other examples, any six member subset of the full-integer pixel position may be used to calculate the value for the sub-pixel position "a." These integer-pixel positions represent examples of the "filter support" of the interpolation filter. In some examples, the filter support may include previously calculated values for other sub-integer pixels.

In another AIF scheme, i.e., S-AIF, prediction unit 32 may use separable interpolation filters using any subset of full-integer pixel positions, instead of non-separable interpolation filters as used in NS-AIF. For example, for the 1D sub-pixel positions, prediction unit 32 (e.g., MC unit 37 of prediction unit 32) applies only horizontal directional filters, only vertical directional filters, only diagonal filters (see FIGS. 4 and 5), only a combined horizontal and vertical directional filter (see FIG. 5), only rectangular filters (see FIGS. 7 and 8), or any other combination of filter support, depending on the sub-pixel location. In one example, a diagonal filter comprises a 6-position (or 6-tap) filter. Prediction unit 32 applies the diagonal filters for sub-pixel positions "e," "j," and "o" with integer-pixel positions A1, B2, C3, D4, E5, and F6 (see FIG. 4) as filter support and applies vertical directional filters for sub-pixel positions "d," "h," and "l" with integer-pixel positions A3, B3, C3, D3, E3 and F3 (see filter support. For the remaining sub-pixel positions, i.e., the 2D sub-pixel positions, prediction unit 32 may apply diagonal filtering followed by vertical filtering, or vertical filtering followed by diagonal filtering. Again, the filter coefficients used for the separable diagonal and vertical filters may be computed in accordance with equation (7) above, in exampels directed to adaptive interpolation filtering. In other examples, any subset and shape of filter support may be used to calculate values for the sub-pixel positions.

MC unit 37 of prediction unit 32 may use one or more of the interpolation techniques described herein, which may increase coding gains during interpolation of values for sub-pixel positions and/or increase the variability of filter support used for interpolating sub-pixel positions. This disclosure describes other examples of sets of filter support that may be used for interpolation (such as diagonal support, or a twelve-pixel filter support with a radial shape) in greater detail below. In addition, techniques for selecting between interpolation filters, techniques for selecting filter support, and techniques for predictively encoding filter coefficients are also described.

Figure 4:
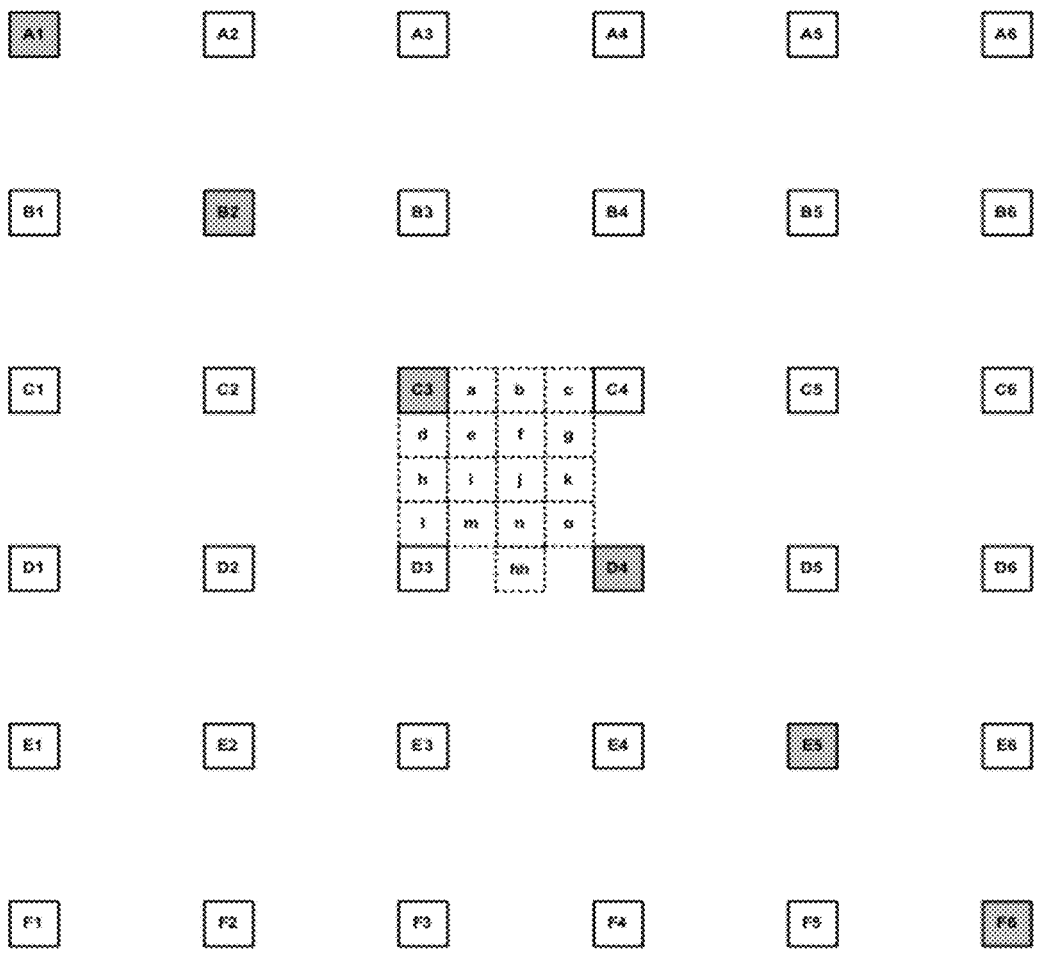
FIG. 4 is a conceptual diagram illustrating an example of a diagonal six pixel filter support with respect to a sub-integer pixel location.

FIG. 4 is a conceptual diagram illustrating a diagonal six pixel filter support with respect to a sub-integer pixel location. In accordance with this disclosure, MC unit 37 may compute sub-pixel values for any of the sub-pixel positions "a" through "o" based on the shaded integer pixel values. In this case, computing any of the sub-pixel values comprises applying an interpolation filter that uses a diagonal array of filter support positions corresponding to a set of six (or possibly more) integer pixel positions that are diagonal with a full-integer pixel position associated with the sub-pixel positions as illustrated in FIG. 4. The filter support positions are shown with shading and capitalized lettering, and the sub-pixel positions are shown as boxes with dotted lines and lower case lettering. MC unit 37 may interpolate pixels in this manner for only a subset of the pixels in a video block, and may generate a prediction block based on interpolating the sub-pixel values. In other examples, MC unit 37 may interpolate pixels in this manner for every pixel of the video block.

Figure 10:
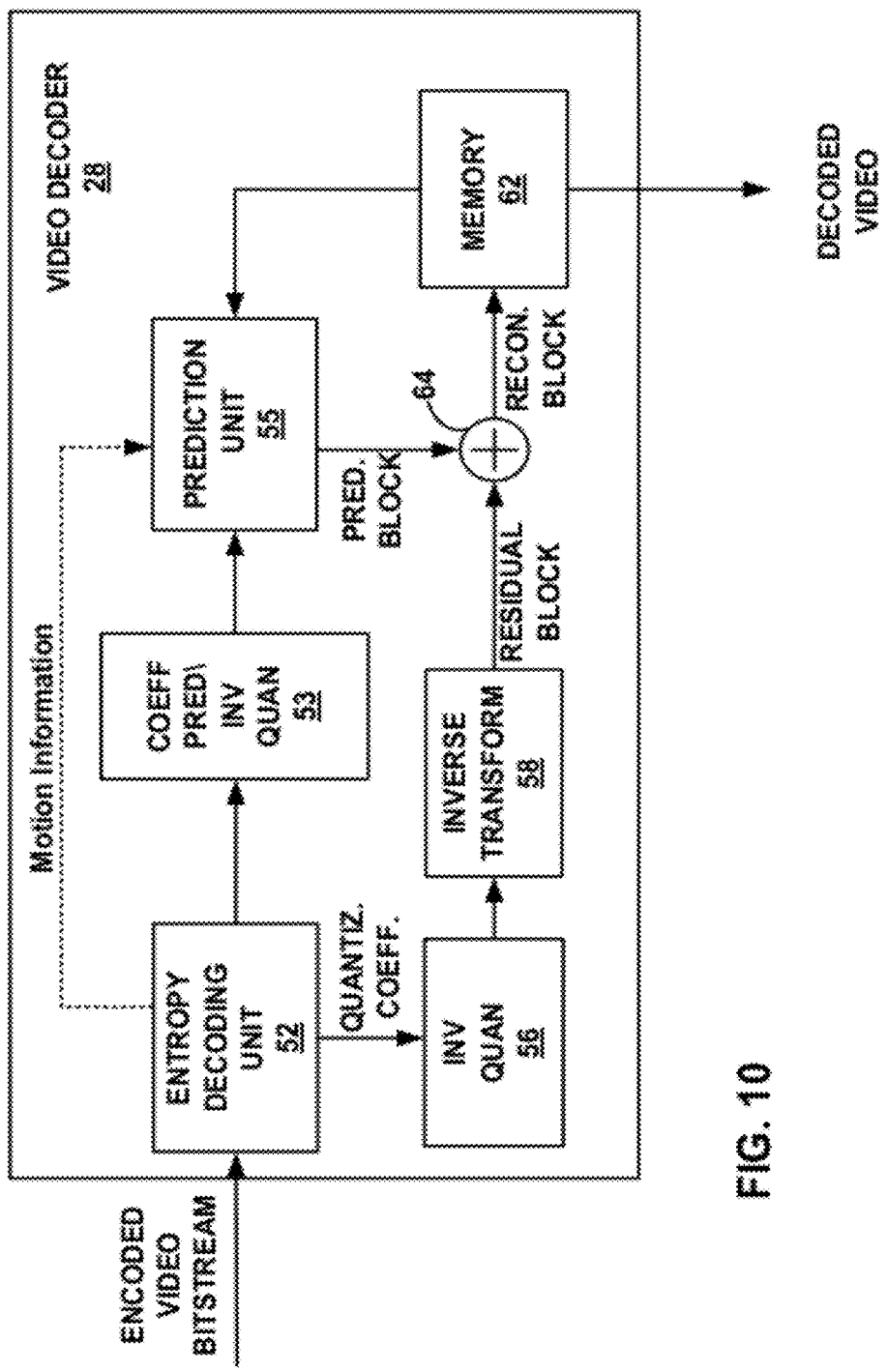
FIG. 10 is a block diagram illustrating an example of the video decoder of FIG. 1 in further detail.

The six position filter support has a diagonal shape in this example. However, in other examples, any other six position filter support can have any other shape. The set of six or more integer pixel positions that run diagonal though the sub-pixel positions are shown with shading in FIG. 4. The filter support may include two of the four integer positions surrounding the sub-pixel positions, C3 and D4, as well as four integer-pixel positions A1, B2, E5, and F6 along a diagonal line through C3 and D4. Such filtering may form part of motion compensation during a video encoding process by video encoder 22 (FIG. 2) or during a video decoding process by video decoder 28 (FIG. 10). During the video encoding process, prediction unit 32 may forward a plurality of sets of coefficient values to entropy coding unit 46 as part of the prediction syntax elements.

As shown in FIG. 4, the set of six or more integer pixel positions that surround the sub-pixel positions has a diagonal shape. In another example, the filter support may include two of the four integer positions surrounding the sub-pixel positions, C4 and D3, as well as four integer-pixel positions A6, B5, E2, and F1 along a diagonal line through C4 and D3. In some examples, only a subset of sub-pixel positions "a" through "o" are determined using diagonal filter support. In other examples, all of the sub-pixel positions "a" through "o" are determined using diagonal filter support.

Entropy coding unit 46 may encode the sets of coefficient values and output the coefficient values of the interpolation filter as part of an encoded bitstream, which may then be transmitted to another device. Each of the plurality of sets of coefficient values defined with respect to each different sub-pixel location shown in FIG. 4 may define different weightings for the six or more integer pixel positions. Entropy coding unit 46 may also encode the sets of filter support and output the sets of filter support as part of an encoded bitstream, which may then be transmitted to another device. Different sets of sub-integer pixel positions may have different sets of filter support. Furthermore, different sets of filter support may be applied to the same or different interpolation filters.

Figure 5:
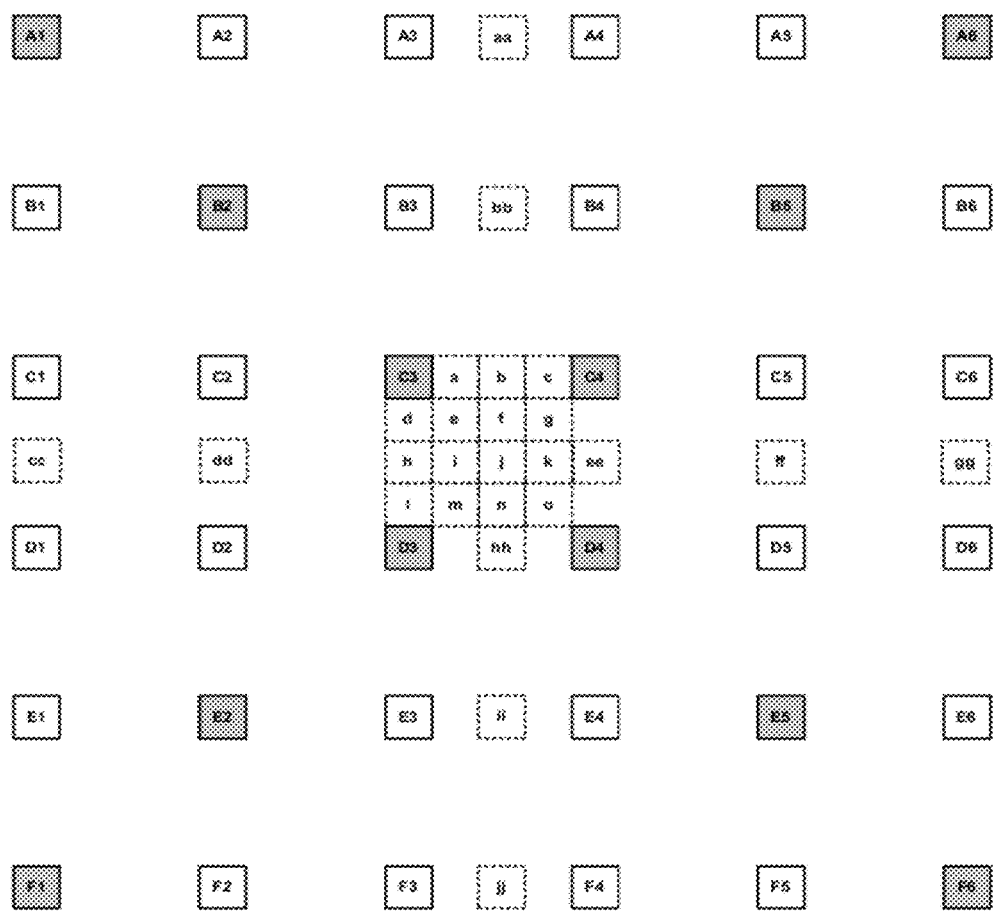
FIG. 5 is a conceptual diagram illustrating an example of an x-shaped twelve pixel filter support with respect to a sub-integer pixel location.

FIG. 5 is a conceptual diagram illustrating an x-shaped twelve pixel filter support with respect to a sub-integer pixel location. In accordance with this disclosure, MC unit 37 may compute sub-pixel values for any of the sub-pixel positions "a" through "o" based on the shaded integer pixel values. In this case, computing any of the sub-pixel values comprises applying an interpolation filter that defines an x-shaped array of filter support positions corresponding to a set of twelve (or possibly more) integer pixel positions that are diagonal with four full-integer pixel position surrounding the sub-pixel positions as illustrated in FIG. 5. The filter support positions are shown with shading and capitalized lettering, and the sub-pixel positions are shown as boxes with dotted lines and lower case lettering. MC unit 37 may interpolate pixels in this manner for only a subset of the pixels in a video block, and may generate a prediction block based on interpolating the sub-pixel values. In other examples, MC unit 37 may interpolate pixels in this manner for every pixel of the video block.

The twelve position filter support has an x-shape. However, in other examples, any other twelve position filter support for any of the sub-pixel positions can have any other shape. The set of twelve or more integer pixel positions that run x-shaped though the sub-pixel positions are shown with shading in FIG. 5. The filter support may include the four integer positions surrounding the sub-pixel positions, C3, C4, D3, and D4, as well as four integer-pixel positions A1, B2, E5, and F6 along a diagonal line through C3 and D4, and four integer-pixel positions A6, B5, E2, and F1 along a diagonal line through C4 and D3. Such filtering may form part of motion compensation during a video encoding process by video encoder 22 (FIG. 2) or during a video decoding process by video decoder 28 (FIG. 10). During the video encoding process, prediction unit 32 may forward a plurality of sets of coefficient values to entropy coding unit 46 as part of the prediction syntax elements.

In some examples, only a subset of sub-pixel positions "a" through "o" are determined using x-shaped filter support. In other examples, all of the sub-pixel positions "a" through "o" are determined using x-shaped filter support.

Entropy coding unit 46 may encode the sets of coefficient values and output the coefficient values of the interpolation filter as part of an encoded bitstream, which may then be transmitted to another device. Each of the plurality of sets of coefficient values defined with respect to each different sub-pixel location shown in FIG. 5 may define different weightings for the twelve or more integer pixel positions. Entropy coding unit 46 may also encode the sets of filter support and output the sets of filter support as part of an encoded bitstream, which may then be transmitted to another device.

Figure 6:
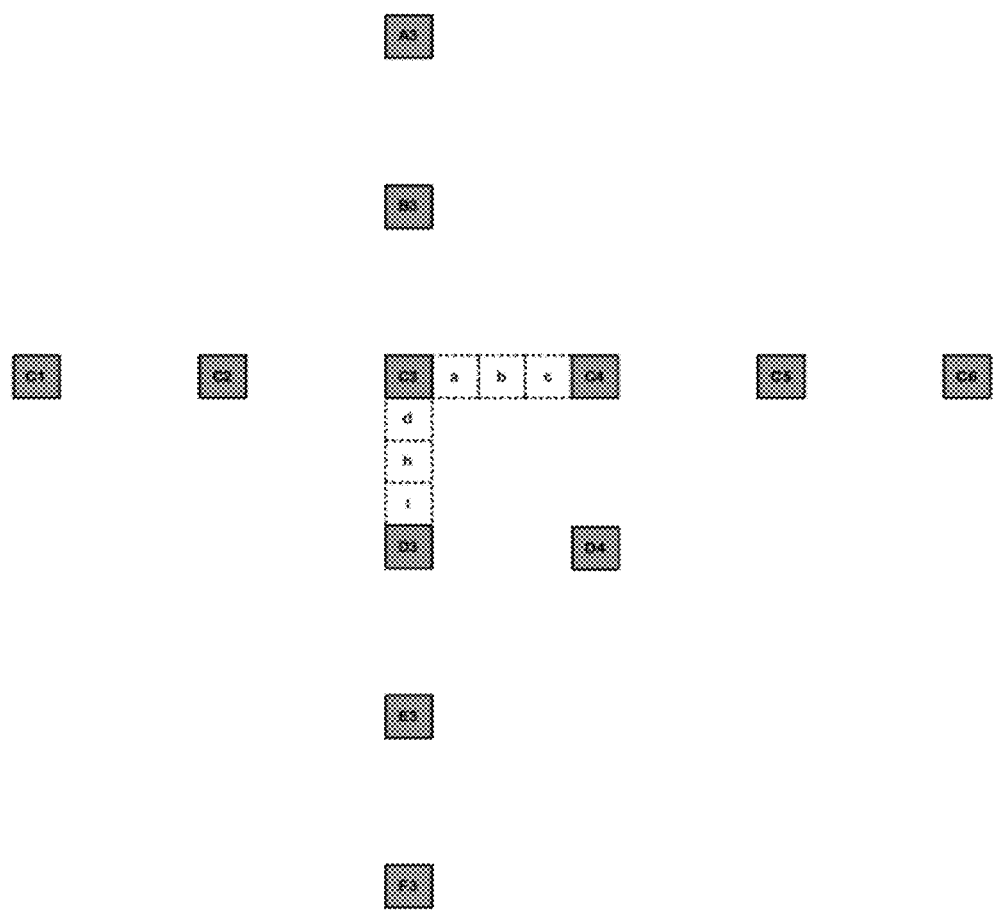
FIG. 6 is a conceptual diagram illustrating an example of a twelve pixel filter support with respect to three horizontal sub-pixel positions and three vertical sub-pixel positions.

FIG. 6 is a conceptual diagram illustrating a cross-shaped, twelve pixel filter support with respect to at least one sub-pixel position. In accordance with this disclosure, MC unit 37 may compute sub-pixel values for any sub-pixel positions associated with a full-pixel position based on the shaded integer pixel values. In this case, computing any of the sub-pixel values comprises applying an interpolation filter that defines an t-shaped array of filter support positions corresponding to a set of twelve (or possibly more) integer pixel positions that may include the four full-integer pixel position surrounding the sub-pixel positions (for example, C3, C4, D3, and D4), as well as vertical integer pixel positions (for example, A3, B3, E3, and F3), and horizontal integer pixel positions (for example, C1, C2, C5, and C6). The filter support positions are shown with shading and capitalized lettering, and some sub-pixel positions are shown as boxes with dotted lines and lower case lettering. MC unit 37 may interpolate pixels in this manner for only a subset of the pixels in a video block, and may generate a prediction block based on interpolating the sub-pixel values. In other examples, MC unit 37 may interpolate pixels in this manner for every pixel of the video block.

As shown in FIG. 6, three horizontal sub-pixel positions "a," "b," and "c," and three vertical sub-pixel positions "d," "h," and "l" may be predicted with the twelve pixel filter support. However, in other examples, any sub-pixel position associated with a full pixel position (such as, C3 shown in FIG. 6) may be predicted using the twelve pixel filter support shown in FIG. 6.

Likewise, entropy coding unit 46 may encode the sets of coefficient values and output the coefficient values of the interpolation filter as part of an encoded bitstream, which may then be transmitted to another device. Each of the plurality of sets of coefficient values defined with respect to each different sub-pixel location shown in FIG. 5 may define different weightings for the twelve or more integer pixel positions. Entropy coding unit 46 may also encode the sets of filter support and output the sets of filter support as part of an encoded bitstream, which may then be transmitted to another device.

Figure 7:
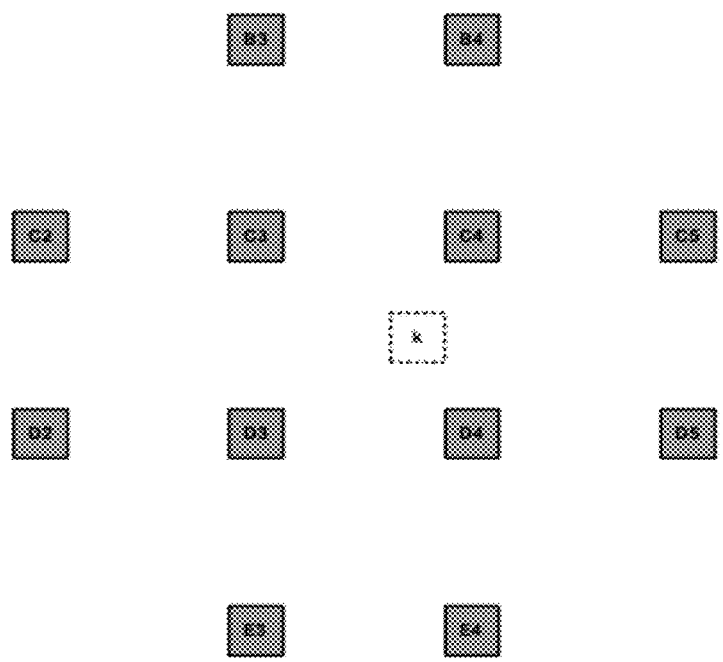
FIG. 7 is a conceptual diagram illustrating an example of a twelve pixel filter support with respect to a sub-pixel location.

FIG. 7 is a conceptual diagram illustrating a circular-shaped (also referred to as a radial-shaped), twelve pixel filter support with respect to a sub-pixel location. Similar to the examples of different filter support described above, MC unit 37 may compute sub-pixel values for any sub-pixel position based on the shaded integer pixel values. In this case, computing the sub-pixel values comprises applying an interpolation filter that defines a two-dimensional array of filter support positions corresponding to a set of twelve (or possibly more or less) integer pixel positions that surround the sub-pixel positions as illustrated in FIG. 7. The filter support positions are shown with shading and capitalized lettering, and the sub-pixel positions are shown as boxes with dotted lines and lower case lettering. MC unit 37 may interpolate pixels in this manner for any pixel of a video block, and may generate a prediction block based on the interpolated sub-pixel value. The 12 position filter support has a radial shape, and has similar frequency response as a 36 position filter support used in NS-AIF but with reduced interpolation complexity.

Figure 16:
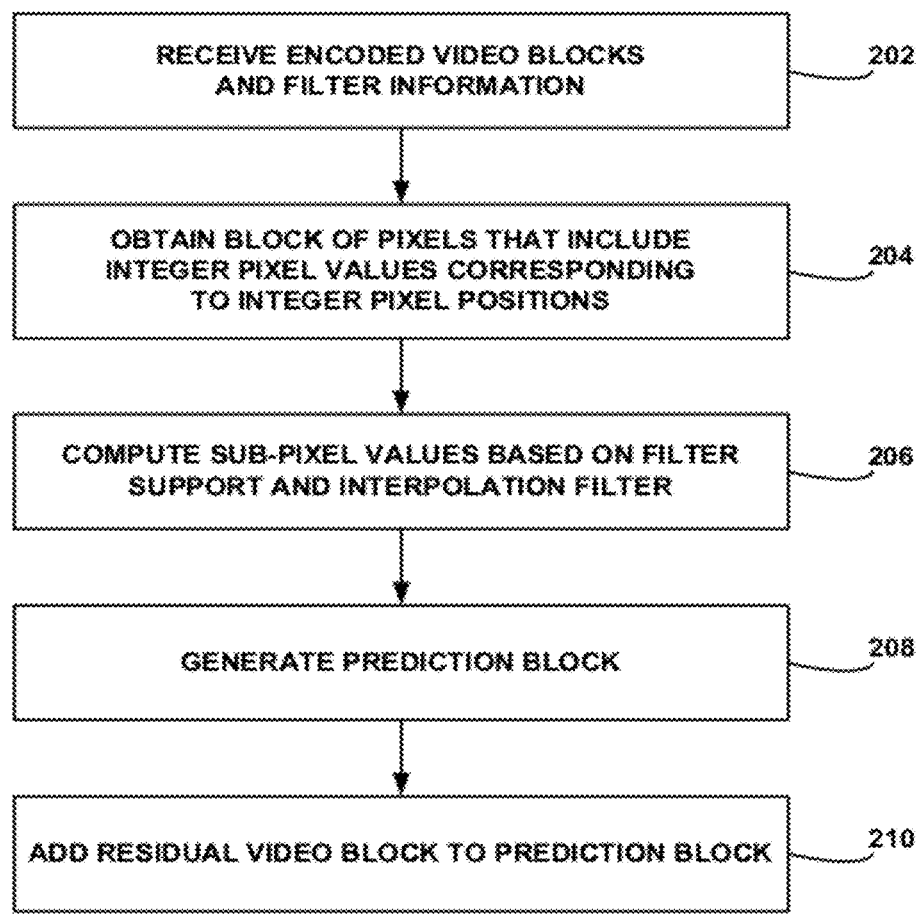
FIG. 16 is a flow diagram illustrating another example operation of a video decoder that utilizes filter support consistent with this disclosure.

The set of twelve or more integer pixel positions that surround the sub-pixel positions are shown with shading in FIG. 4, and may include four integer-pixel positions C3, C4, D3, and D4 surrounding the fifteen half-pel and quarter-pel values, and eight integer-pixel positions B3, B4, C2, C5, D2, D5, E3, and E4 surrounding the four integer-pixel positions. Each of the filter support positions in the two-dimensional array of filter support positions shown in FIG. 7 are within two integer-pixel positions relative to the sub-pixel positions. Such filtering may form part of motion compensation during a video encoding process by video encoder 22 (FIG. 2) or during a video decoding process by video decoder 28 (FIG. 16). During the video encoding process, prediction unit 32 forward a plurality of sets of coefficient values to entropy coding unit 46 as part of the prediction syntax elements.

As shown in FIG. 4, the set of twelve integer pixel positions that surround the sub-pixel positions has a radial shape and may comprise a set of spatially closest integer pixel positions to the sub-pel values defined by the interpolation filter (e.g., filter(s) 39 in FIG. 2). In other examples, the radial shape shown in FIG. 7 may be shifted, for example, one full pixel to the left or right. In yet other examples, any set of any number of full integer pixel positions are used to predict a sub-pel position with an interpolation filter.

Figure 8:
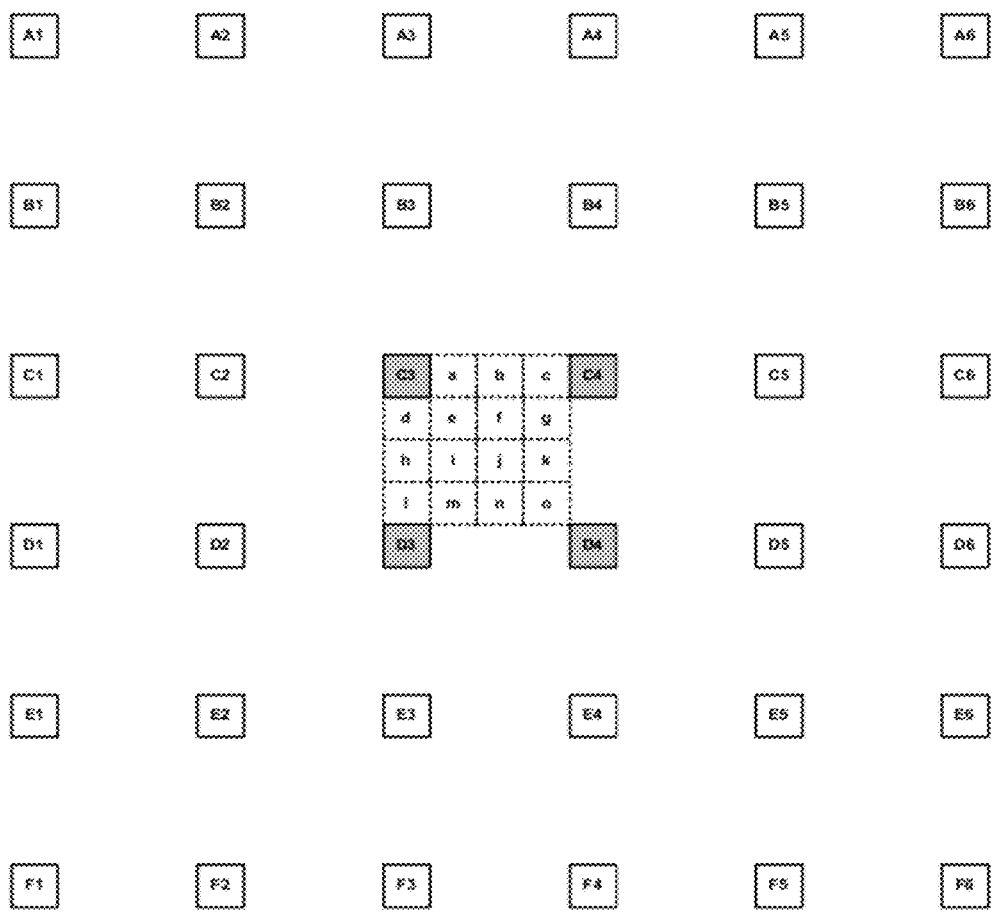
FIG. 8 is a conceptual diagram illustrating an example of a square-shaped four pixel filter support with respect to a sub-integer pixel location.

FIG. 8 is a conceptual diagram illustrating a square-shaped four pixel filter support with respect to at least one sub-integer pixel location. In accordance with this disclosure, MC unit 37 may compute sub-pixel values for any sub-pixel positions associated with a full-pixel position based on the shaded integer pixel values. In this case, computing any of the sub-pixel values comprises applying an interpolation filter that defines a square-shaped array of filter support positions corresponding to a set of four integer pixel positions. In the example shown in FIG. 8, the four integer pixel positions include the four full-integer pixel position surrounding the sub-pixel positions, namely C3, C4, D3, and D4. The filter support positions are shown with shading and capitalized lettering, and some sub-pixel positions are shown as boxes with dotted lines and lower case lettering.

MC unit 37 may interpolate pixels in this manner for only a subset of the pixels in a video block, and may generate a prediction block based on interpolating the sub-pixel values. In other examples, MC unit 37 may interpolate pixels in this manner for every pixel of the video block. MC unit 37 may use any appropriate type of interpolation filter to predict a sub-pixel position using these four integer pixel positions. In other examples, MC unit 37 may interpolate sub-pixel positions using any set of four full integer pixel positions.

Figure 9:
FIG. 9 is a conceptual diagram illustrating an example of a rectangular-shaped six pixel filter support with respect to a sub-integer pixel location.

FIG. 9 is a conceptual diagram illustrating a rectangular-shaped six pixel filter support with respect to a sub-integer pixel location. In this example, MC unit 37 may compute sub-pixel values for any sub-pixel positions associated with a full-pixel position based on the shaded integer pixel values. The filter support positions are shown with shading and capitalized lettering, and some sub-pixel positions are shown as boxes with dotted lines and lower case lettering. In this case, computing any of the sub-pixel values comprises applying an interpolation filter that defines a rectangular-shaped array of filter support positions corresponding to a set of six integer pixel positions. In the example shown in FIG. 8, the six integer pixel positions include the four full-integer pixel position surrounding the sub-pixel positions, as well as two additional full-integer pixel positions adjacent to the four full-integer pixel position surrounding the sub-pixel positions. As sub-pixel position "f" is predicted in FIG. 9, the filter support includes the four full-pixel positions located around sub-pixel "f," C3, C4, D3, and D4, as well as adjacent full-pixel positions B3 and B4.

In other examples, the adjacent full-pixel positions may include C2 and D2, C5 and D5, or E3 and E4. In other examples, MC unit 37 may interpolate sub-pixel positions using any set of six full-integer pixel positions. Any suitable six-tap interpolation filter may be used to predict the sub-integer pixel position.

Entropy coding unit 46 may encode the sets of coefficient values and output the coefficient values of the interpolation filter as part of an encoded bitstream, which may then be transmitted to another device. Each of the plurality of sets of coefficient values defined with respect to each different sub-pixel location shown in FIG. 9 may define different weightings for the twelve or more integer pixel positions. Entropy coding unit 46 may also encode the sets of filter support and output the sets of filter support as part of an encoded bitstream, which may then be transmitted to another device.

Referring again to FIG. 3, different sets of sub-integer pixel positions within a single prediction unit may have applied the same interpolation filter to different sets of filter support from the same image frame. Furthermore, the same or different interpolation filters may be applied to the different sets of filter support within a single prediction unit. For example, sub-pixel position "e" may be predicted using a six diagonal support as shown in FIG. 4. The filter support for sub-pixel "e" may include full-integer pixel positions A1, B2, C3, D4, E5, and F6. The interpolation filter used for sub-pixel "e" may be a six-tap Wiener filter. Within the same prediction unit, sub-pixel position "j" may be predicted using a set of twelve full-integer pixel positions having an x-shaped as shown in FIG. 5. The filter support for sub-pixel "j" may include full-integer pixel positions A1, A6, B2, B5, C3, C4, D3, D4, E2, E5, F1, and F6. The interpolation filter used for sub-pixel "e" may be a twelve-tap Wiener filter.

Additionally, sub-integer pixel position "h" may be predicted using the cross-shaped support as shown in FIG. 6. The filter support for sub-pixel "h" may include twelve full-integer pixel positions including A3, B3, C1, C2, C3, C4, C5, C6, D3, D4, E3, and F3. The interpolation filter used for predicting sub-pixel "h" may be a twelve-tap separable or non-separable filter. Another sub-pel position, "k" may be predicted as shown in FIG. 7. The round-shaped filter support for sub-pixel "k" may include twelve full-integer pixel positions including B3, B4, C2, C3, C4, C5, D2, D3, D4, D5, E3, and E4. The interpolation filter used for predicting sub-pixel "h" may be a twelve-tap filter.

Furthermore, as shown in FIG. 8, sub-integer pixel position "m" may be predicted using the closest four full-integer pixel positions to sub-pixel "m." A four-tap interpolation filter may be used with filter support including C3, C4, D3, and D4 for sub-pixel "m." As another example, sub-integer pixel position "f" may be predicted using the rectangular-shaped support as shown in FIG. 9. The filter support for sub-pixel "f" may include six full-integer pixel positions including B3, B4, C3, C4, D3, and D4. The interpolation filter used for predicting sub-pixel "f" may be a twelve-tap separable or non-separable filter.

Described above are just a few examples of different sets of filter support used for predicting sub-pixel positions for a prediction unit. As described herein, sub-pixel positions "e," "j," "h," "k," "m," and "f" are each predicted using a different filter support. Some of these sub-pixel positions may be predicted using the same interpolation filter. For example, sub-pixel "e" and "f" may both be predicted using a six-tap Wiener filter. Other sub-pixel positions may be predicted using different interpolation filters than other sub-pixel positions.

In other examples, some full-integer pixel positions may be repeated in calculating a value of a sub-pixel position. For example, if a 1D 6-tap interpolation filter is being used, the support for the sub-pixel position may comprise a set of less than six full-integer pixel positions. In such an example, one or more of the full-integer pixel positions are repeated. In one example, those full-integer pixel positions that are nearest to the sub-pixel position are the ones that are repeated. Likewise, in one example, for half-pixel position "e," the taps of the 6-tap filter may correspond to B3, C3, C4, D3, and D4. For example, pixel values for sub-pixel position "e" may be computed using equation (8):

$$e=((B3-5*C4+20*C3+20*C3-5*D3+D4)+16)/32 \quad (8)$$

As described in these particular examples, no sub-pel position depends on another sub-pel position. However, in other examples, a sub-pel position may depend on another sub-pel position. Many other examples are possible, including any combination of filter support and any choice of interpolation filter for each sub-pixel position. Many other filter sizes and shapes may be used in accordance with sub-pel filtering.

FIG. 10 is a block diagram illustrating an example of a video decoder 28, which may decode a video sequence that is encoded in the manner described herein. Video decoder 28 is one example of a specialized video computer device or apparatus referred to herein as a "coder." As shown in FIG. 10, video decoder 28 corresponds to video decoder 28 of device 20. However, in other examples, video decoder 28 may correspond to a different device. In further examples, other units (such as, for example, other encoder/decoder (CODECS)) can also perform similar techniques as video decoder 28.

Video decoder 28 includes an entropy decoding unit 52 that entropy decodes the received bitstream to generate quantized coefficients and the prediction syntax elements. The prediction syntax elements may include a coding mode, one or more motion vectors, information identifying an interpolation technique use to generate the sub-pixel data, coefficients for use in interpolation filtering, and/or other information associated with the generation of the prediction block.

The prediction syntax elements, e.g., the coefficients, are forwarded to prediction unit 55. If prediction is used to code the coefficients relative to coefficients of a fixed filter, or relative to one another, coefficient prediction and inverse quantization unit 53 can decode the syntax elements to define the actual coefficients. Also, if quantization is applied to any of the prediction syntax, coefficient prediction and inverse quantization unit 53 can also remove such quantization. Filter coefficients, for example, may be predictively coded and quantized according to this disclosure, and in this case, coefficient prediction and inverse quantization unit 53 can be used by video decoder 28 to predictively decode and de-quantize such coefficients.

Prediction unit 55 may generate prediction data based on the prediction syntax elements and one or more previously decoded blocks that are stored in memory 62, in much the same way as described in detail above with respect to prediction unit 32 of video encoder 22. In particular, prediction unit 55 may perform one or more of the interpolation filtering techniques of this disclosure during motion compensation to generate a prediction block with a particular precision, such as quarter-pixel precision. As such, one or more of the techniques of this disclosure may be used by video decoder 28 in generating a prediction block. Prediction unit 55 may include a motion compensation unit that comprises filters used for interpolation and interpolation-like filtering techniques of this disclosure. The motion compensation component is not shown in FIG. 10 for simplicity and ease of illustration.

Inverse quantization unit 56 inverse quantizes, i.e., de-quantizes, the quantized coefficients. The inverse quantization process may be a process defined for H.264 decoding or for any other decoding standard. Inverse transform unit 58 applies an inverse transform, e.g., an inverse DCT or conceptually similar inverse transform process, to the transform coefficients in order to produce residual blocks in the pixel domain. Summer 64 sums the residual block with the corresponding prediction block generated by prediction unit 55 to form a reconstructed version of the original block encoded by video encoder 22. If desired, a deblocking filter may also be applied to filter the decoded blocks in order to remove blockiness artifacts. The decoded video blocks are then stored in memory 62, which provides reference blocks for subsequent motion compensation and also produces decoded video to drive display device (such as device 28 of FIG. 1).

Using the interpolation filtering techniques of this disclosure, video decoder 28 may compute pixel values for the sub-pixel positions using an interpolation filter having any size or shape filter support. In one example, video decoder 28 uses NS-AIF techniques to compute pixel values for a sub-pixel using a 36-position filter support (i.e., a 2D 6×6 filter support, as shown in FIG. 3). As another example, S-AIF may use separable integer pixel positions as filter support for interpolation filtering. In yet another example, D-AIF computes sub-pixel positions using an interpolation filter having either a six-position filter support or a twelve-position diagonal filter support. Other interpolation filters, such as any ITU-T H.264 interpolation filter, may be used to compute the sub-pixel positions. Any suitable interpolation filter now known or later contemplated may be used to code or decode a sub-pixel position. Furthermore, video decoder 28 may use interpolation filters that are fixed interpolation filters, switched interpolation filters, or adaptive interpolation filters, or combinations thereof The interpolation filters may further be separable or non-separable. In one example video decoder 28 may receive an indication of the filter to apply, as well as an indication of the set of filter support to which to apply the filter, in a received bitstream (for example, from video encoder 22).

In some cases, filter support may be chosen based on its likely correlation with a given sub-pixel. For example, one drawback of using the diagonal filter support as in D-AIF is that the integer-pixel positions used in filtering are far away from the current position to be interpolated. As distance between the current position to be interpolated and the positions of the pixels used as filter support increases, spatial pixel correlation decreases. As such, the diagonal filter support used in D-AIF is less suitable for forming an accurate prediction.

In order to provide better prediction using pixels with higher correlation with the position to be interpolated (that is, pixel positions that are closer by or a shorter distance from the position to be interpolated), while maintaining the same low complexity offered by D-AIF, a more suitable set of filter support may be used for the sub-pixel (for example, the four-position filter support shown in FIG. 8 may be used for interpolation). The integer-pixel positions used in the four-position filter support described in this disclosure include the four integer-pixel positions surrounding the sub-pixel positions, i.e., integer-pixel positions C3, C4, D3, and D4, which may be referred to as "corner" integer-pixel positions as they are located near the corners of the sub-pixel positions. In addition to the corner integer-pixel positions, one or more integer-pixel positions immediately adjacent to the corner integer-pixel positions may also be used in the filter support, as shown in FIG. 9. The integer-pixel positions immediately adjacent to the corner integer-pixel positions may include integer-pixel positions directly above (toward the top or north) or directly below (toward the bottom or south) the corner integer-pixel positions as well as integer-pixel positions directly to the left (or west) or directly to the right (or east) of the corner integer-pixel positions. All of these integer-pixel positions are located within two integer-pixel positions of the sub-pixel to be interpolated, in these particular examples.

Filter support in accordance with the techniques of this disclosure may, however, include additional integer-pixel locations. For example, the filter support may include integer-pixel locations that are located within three integer-pixel positions of the sub-pixel position to be interpolated that form a radial shape. Additionally, filter support may include integer-pixel locations that are located within four or more integer-pixel positions of the sub-pixel position. In some examples, filter support may include any subset of the full integer pixel positions in the given coded block.

Even quarter-pixel positions or finer resolution may be interpolated based on integer pixel positions located within at least two integer-pixel positions. Also, filter support may be chosen based on a correlation of the full-integer pixel positions with the sub-pixel position. In this manner, the filter support techniques of this disclosure provide better interpolation prediction using integer-pixels with higher correlation with the position to be interpolated. Further, any sub-pel can be predicted or decoded without having to predict or decode another sub-pel upon which it depends.

Figure 11:
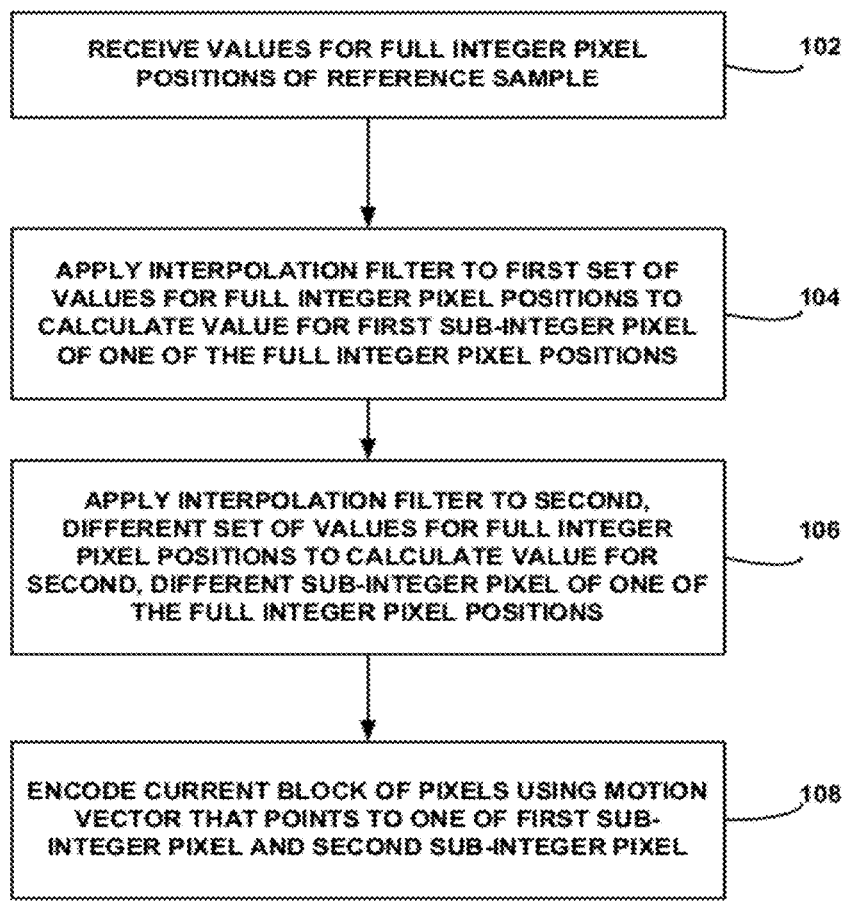
FIG. 11 is a flow diagram illustrating an example operation of a video encoder that utilizes pixel filter support consistent with this disclosure.

FIG. 11 is a flow diagram illustrating an example operation of a video encoder that utilizes pixel filter support consistent with this disclosure. The technique of FIG. 11 will be described from the perspective of video encoder 22 of FIG. 2 although other devices may perform similar techniques. Video encoder 22 may receive values for a plurality of full integer pixel positions of a reference sample (102).

Video encoder 22 may apply an interpolation filter to a first set of the values for the plurality of full integer pixel positions to calculate a value for a first sub-integer pixel of one of the plurality of full integer pixel positions (104). Video encoder 22 may apply the same interpolation filter to a second, different set of the values for the plurality of full integer pixel positions to calculate a value for a second, different sub-integer pixel of the one of the full integer pixel positions (106). Based on these calculated values, video encoder 22 may encode a current block of pixels using a motion vector that points to one of the first sub-integer pixel and the second sub-integer pixel. Techniques similar to the example operation of video encoder 22 described with respect to FIG. 11 will be explained further in FIGS. 12 and 13.

Figure 12:
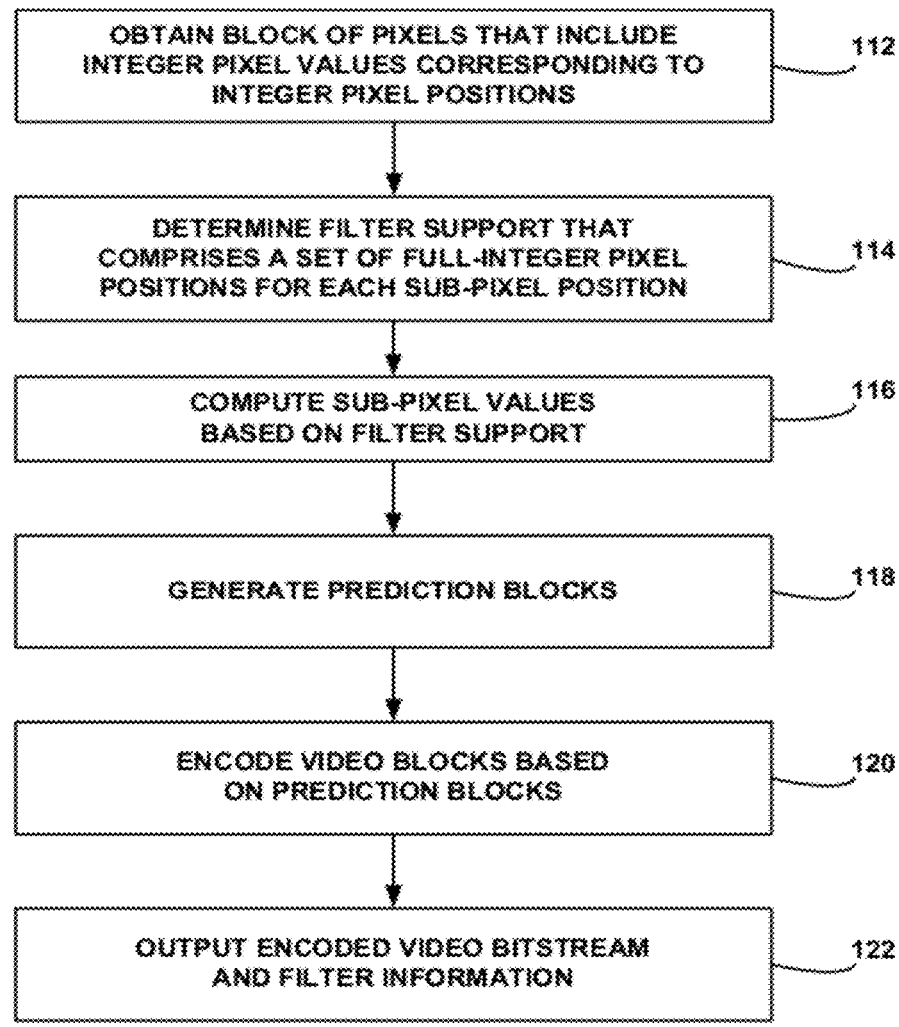
FIG. 12 is a flow diagram illustrating another example operation of a video encoder that utilizes pixel filter support consistent with this disclosure.

FIG. 12 is a flow diagram illustrating another example operation of a video encoder that utilizes pixel filter support consistent with this disclosure. The technique of FIG. 12 will be described from the perspective of video encoder 22 of FIG. 2 although other devices may perform similar techniques. As shown, in FIG. 12, MC unit 37 of prediction unit 32 obtains a block of pixels from memory 34 that include integer pixel values corresponding to integer pixel positions (112). For each sub-pixel position, encoder 22 determines filter support that comprises a subset of the full-integer pixel positions in the block of pixels (114). Methods for determining filter support are described below with respect to FIGS. 12 and 13. Methods for determining filter support may depend upon specific characteristics of the encoder being used, such as video encoder 22.

Filter(s) 39 compute sub-pixel values based on a set of filter support that comprises any number of full integer pixel positions that surround the sub-pixel positions (116). As explained in greater detail above, the filter support may be used to generate any possible sub-pixel interpolations.

Once the filter support is determined, MC unit 37 then generates a prediction block based on the computed sub-pixel values (118). In particular, MC unit 37 may generate and output an interpolated prediction block comprising interpolated sub-pixel values. Adder 48 can then encode a current video block based on the interpolated prediction block (120), e.g., by subtracting the interpolated prediction block from the video block being encoded to generate a residual block. The residual block may then be transformed and quantized by transform unit 38 and quantization unit 40, respectively. Following entropy coding by entropy coding unit 46, video encoder 22 can output an encoded video bitstream and filter information (122). The filter information, as described herein, may comprise an indication of what filter support was used to encode each sub-pixel position. The filter information may also include an indication of what interpolation filter was used for a particular sub-pixel position. The filter information may be output once per coded unit, or possibly several times per coded unit if different areas of a coded unit use different types of sub-pel interpolation.

Figure 13:
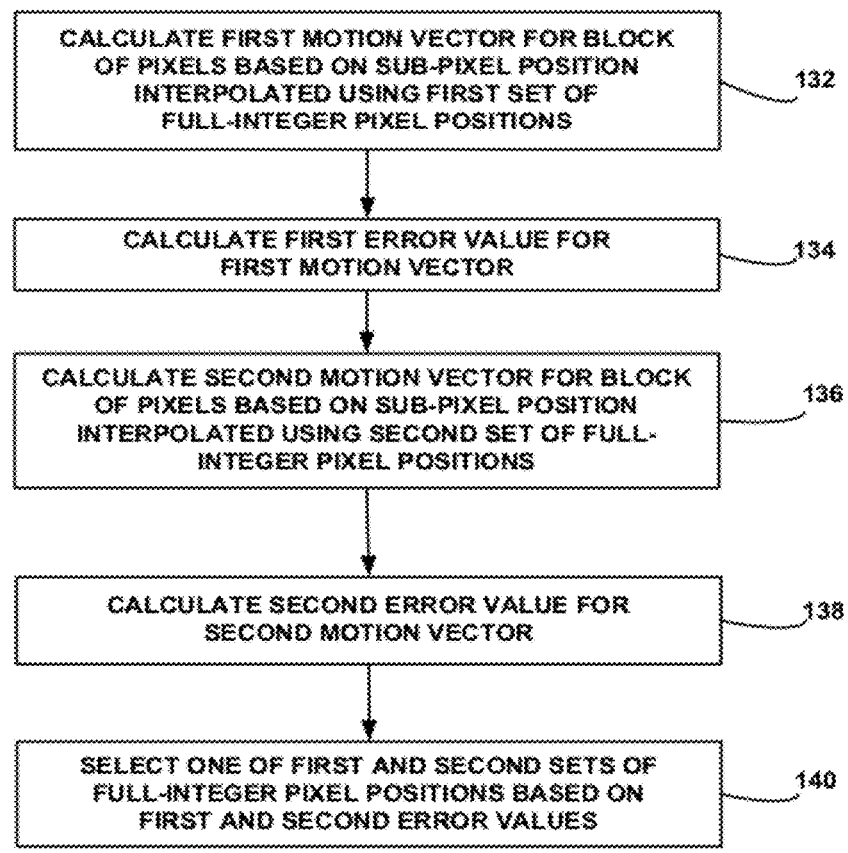
FIG. 13 is a flow diagram illustrating an example method of determining filter support for sub-integer pixel consistent with this disclosure.

FIG. 13 is a flow diagram illustrating an example method of determining filter support for a sub-integer pixel consistent with this disclosure. The technique of FIG. 13 will be described from the perspective of video encoder 22 of FIG. 2 although other devices may perform similar techniques. Video encoder 22 may employ multi-pass techniques to determine which filter support to use for each sub-pixel position in a block of pixels.

As shown, in FIG. 13, video encoder 22 calculates a first motion vector for the block of pixels based on a sub-pixel position interpolated using a first set of full-integer pixel positions (132). A motion vector may be calculated for the frame using, for example, a conventional motion estimation method. As described above, any shape or number of full-integer pixel positions may be used to predict a sub-pel position. Video encoder 22 may calculate a first error value for the first motion vector (134). In one example, encoder 22 may calculate the first error value using a mean square error of the prediction for the sub-pel position.

Video encoder 22 may calculate a second motion vector for the block of pixels based on the sub-pixel position interpolated using a second set of full-integer pixel positions (136). The first set of full-integer pixel positions may be different than the second set of full-integer pixel positions. Video encoder 22 may calculate a second error value for the second motion vector (138). Similarly, the second error value may be calculated using a mean square error calculation.

Based on a comparison of the first and second error values, encoder 22 may select one of the first and second sets of full-integer pixel positions (140). For example, a set of full-integer pixel positions may be selected as filter support for a sub-pixel position because that set of full-integer pixel positions results in a smaller error for the sub-pixel position. The technique shown in FIG. 13 may be applied for each sub-pixel position in a block of pixels. In other examples, the technique shown in FIG. 13 may be once per block of pixels for a single sub-pixel position.

In one example, this determination may be made on a sub-pixel by sub-pixel basis. Further, this example method may be performed for each of a plurality of different interpolation filters. In such an example, a filter support and interpolation filter may be chosen for a given factor, such as providing the least error.

For all blocks which point to a sub-pel, for example, sub-pel "b," encoder 22 predicts sub-pel "b" using a plurality of sets of full-integer pixel locations. Encoder 22 may then calculate mean square error for the various predictions of sub-pel "b," and select the set of full-integer pixel locations that correspond to the prediction of sub-pel "b" that gives the least error. Video encoder 22 may repeat this process for each sub-pixel position. In other examples, video encoder 22 applies similar sets of filter support to similarly situated sub-pixel positions.

Figure 14:
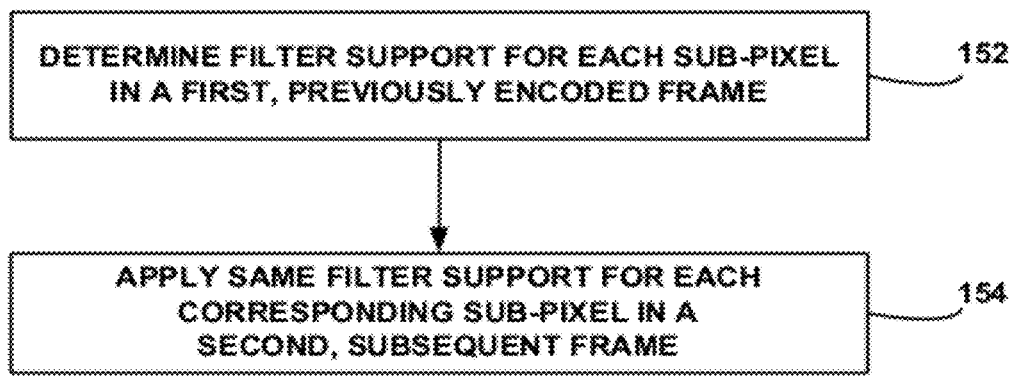
FIG. 14 is a flow diagram illustrating another example method of determining filter support for sub-integer pixel consistent with this disclosure.

FIG. 14 is a flow diagram illustrating another example method of determining filter support for a sub-integer pixel consistent with this disclosure. In this example, filter support is determined for each sup-pixel location in a first, previously encoded frame (152). In one example, the filter support is determined for the first frame as described with respect to FIG. 13. The video encoder 22 may apply the same sets of filter support to each sub-pixel in a second, subsequent frame as the sets of filter support were applied to the corresponding sub-pixel in the preceding frame (154). The example method avoids performing multi-pass techniques.

Other methods of selecting filter support for a sub-pel position may include selecting a subset of any number of full-integer pixel positions that surround the sub-pixel position. The full-integer pixel positions may be selected based on any number of factors, including the location of the sub-pixel position to be predicted, a correlation of the full-integer pixel position with the sub-pixel position, or proximity of the full-integer pixel position to the sub-pixel position.

Some example sets of filter support for a sub-pixel value may be based on a set of filter support that comprises twelve or more positions that surround the sub-pixel positions, as shown in FIGS. 3 and 7. In another example, filter(s) 39 compute sub-pixel values based on a set of filter support that comprises six or more positions that include a full integer pixel position associated with the sub-pixel position, as shown in FIGS. 4-7 and 9. In yet another example, filter(s) 39 compute sub-pixel values based on a set of filter support that comprises four full-integer pixel positions surrounding the sub-pixel position, as shown in FIG. 8.

Figure 15:
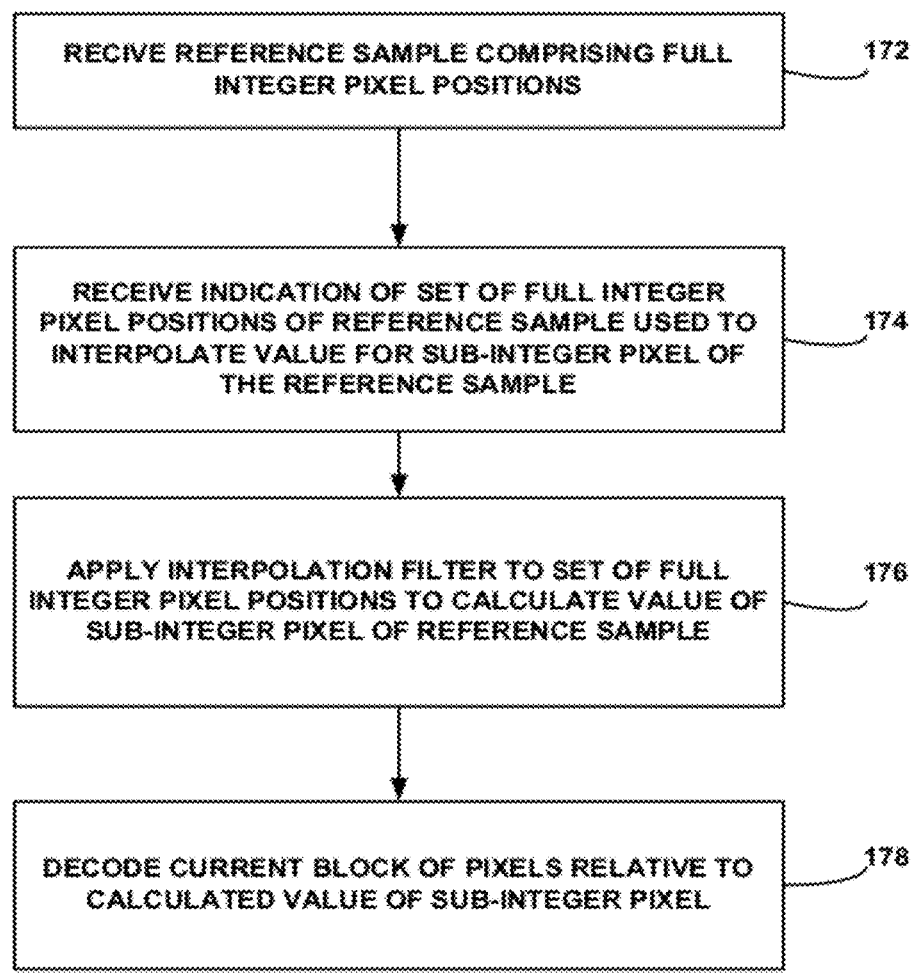
FIG. 15 is a flow diagram illustrating an example operation of a video decoder that utilizes filter support consistent with this disclosure.

FIG. 15 is a flow diagram illustrating an example operation of a video decoder that utilizes filter support consistent with this disclosure. Thus, the process of FIG. 15 may be considered the reciprocal decoding process to the encoding process of FIG. 11. FIG. 14 will be described from the perspective of video decoder 28 of FIG. 10 although other devices may perform similar techniques.

Video decoder 28 may receive a reference sample comprising a plurality of full integer pixel positions (172). In one example, video decoder 28 receives the reference sample from a video encoder, such as video encoder 22. Video decoder 28 may receive an indication of a set of the full integer pixel positions of the reference sample (174). The set of full integer pixel positions may have been used to interpolate a value for a sub-integer pixel of the reference sample.

The interpolation filter may be applied to the set of the full integer pixel positions by video encoder 28 to calculate the value of the sub-integer pixel of the reference sample (176). Video decoder 28 may also decode a current block of pixels relative to the calculated value of the sub-integer pixel (178). Techniques similar to the example operation of video decoder 28 described with respect to FIG. 15 will be explained further in FIG. 16.

FIG. 16 is a flow diagram illustrating another example operation of a video decoder that utilizes filter support consistent with this disclosure. Thus, the process of FIG. 16 may be considered the reciprocal decoding process to the encoding process of FIG. 12. FIG. 14 will be described from the perspective of video decoder 28 of FIG. 10 although other devices may perform similar techniques.

As shown in FIG. 14, video decoder 28 receives an encoded video blocks and filter information (202). Entropy decoding unit 52 may entropy decode this received information. Prediction unit 55 performs interpolative motion compensation according to techniques of this disclosure. In particular, prediction unit 55 obtains a block of pixels from memory 62 that include integer pixel values corresponding to integer pixel positions (204). Prediction unit 55 may use received motion vectors to determine how to perform interpolation.

Based on the motion vectors, prediction unit 55 can compute sub-pixel based on a set of filter support and a type of interpolation filter (206). In some examples, the type of interpolation filter remains is same for some sub-pixel positions. In one example, an indication of the set of the full integer pixel positions used to encode the current block of pixels is provided to decoder 28 in at least one of a prediction unit level, a coding unit level, a frame level, a slice level, or a sequence level of the current block of pixels. In this way, prediction unit 55 uses interpolation to generate the prediction block (208). The prediction block may be used to decode a residual video block by invoking adder 64 to add the prediction block to the residual block (210). The various aspects of interpolation described herein, including the use of a different sets of filter support for sub-pixel positions, may improve video encoding by providing better quality interpolate data than conventional techniques.

The techniques described in this disclosure may be implemented in hardware, software, firmware, or any combination thereof. Any features described as units or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software units or hardware units configured for encoding and decoding, or incorporated in a combined video encoder-decoder (CODEC). Depiction of different features as units is intended to highlight different functional aspects of the devices illustrated and does not necessarily imply that such units must be realized by separate hardware or software components. Rather, functionality associated with one or more units may be integrated within common or separate hardware or software components.

Various examples of this disclosure have been described. These and other examples are within the scope of the following claims.

The invention claimed is:

1. A method of decoding video data, the method comprising:
   determining, by a video decoder, a sub-integer pixel location of a reference block identified by a motion vector for a current block of video data, the motion vector having sub-pixel precision identifying the sub-integer pixel location of the reference block, the sub-integer pixel location being one of a total of fifteen different sub-integer pixel locations associated with a full integer pixel of the reference block;
   determining, by the video decoder, a set of filter support for the sub-integer pixel location from a set of fifteen different sets of filter support, each of the fifteen sets of filter support being associated with a different sub-integer pixel location of the fifteen different sub-integer pixel locations, each of the sets of filter support comprising a different respective combination of one or more full integer pixels of a reference picture including the reference block or one or more sub-integer pixels of the reference picture, each of the combinations of the one or more full integer pixels or the one or more sub-integer pixels having a total of six or more full-integer pixels or sub-integer pixels arranged in a linear shape in the reference picture;
   interpolating, by the video decoder, a value for a prediction block for the current block at a full integer pixel location corresponding to the sub-integer pixel location, wherein interpolating comprises applying an interpolation filter to the set of filter support for the sub-integer pixel location, the interpolation filter having six or more taps; and
   combining, by the video decoder, a residual block for the current block with the prediction block to decode the current block.

2. The method of claim 1, wherein, for each respective sub-integer pixel location of the sub-integer pixel locations associated with the full integer pixel, the set of filter support for the respective sub-integer pixel location has a horizontal or vertical shape.

3. The method of claim 1, wherein each of the sub-integer pixel locations associated with the full integer pixel uses a different interpolation filter.

4. The method of claim 1, further comprising:
   selecting, by the video decoder, based on previously decoded frames, the set of filter support for the sub-integer pixel location.

5. A method of encoding video data, the method comprising:
   determining, by a video encoder, a sub-integer pixel location of a reference block identified by a motion vector for a current block of video data, the motion vector having sub-pixel precision identifying the sub-integer pixel location of the reference block, the sub-integer pixel location being one of a total of fifteen different sub-integer pixel locations associated with a full integer pixel of the reference block;
   determining, by the video encoder, a set of filter support for the sub-integer pixel location from a set of fifteen different sets of filter support, each of the fifteen sets of filter support being associated with a different sub-integer pixel location of the fifteen different sub-integer pixel locations, each of the sets of filter support comprising a different respective combination of one or more full integer pixels of a reference picture including the reference block or one or more sub-integer pixels of the reference picture, each of the combinations of the one or more full integer pixels or the one or more sub-integer pixels having a total of six or more full-integer pixels or sub-integer pixels arranged in a linear shape in the reference picture;
   interpolating, by the video encoder, a value for a prediction block for the current block at a full integer pixel location corresponding to the sub-integer pixel location, wherein to interpolate the value, the one or more processors are configured to apply an interpolation filter to the set of filter support for the sub-integer pixel location, the interpolation filter having six or more taps; and
   subtracting, by the video encoder, the prediction block from the current block being encoded to generate a residual block.

6. The method of claim 5, wherein, for each respective sub-integer pixel location of the sub-integer pixel locations associated with the full integer pixel, the set of filter support for the respective sub-integer pixel location has a horizontal or vertical shape.

7. The method of claim 5, wherein each of the sub-integer pixel locations associated with the full integer pixel uses a different interpolation filter.

8. The method of claim 5, further comprising:
   selecting, by the video encoder, based on previously encoded frames, the set of filter support for the sub-integer pixel location.

9. A device for decoding video data, the device comprising:
   a memory configured to store the video data; and
   one or more processors configured to:
      determine a sub-integer pixel location of a reference block identified by a motion vector for a current block of video data, the motion vector having sub-pixel precision identifying the sub-integer pixel location of the reference block, the sub-integer pixel location being one of a total of fifteen different sub-integer pixel locations associated with a full integer pixel of the reference block;

determine a set of filter support for the sub-integer pixel location from a set of fifteen different sets of filter support, each of the fifteen sets of filter support being associated with a different sub-integer pixel location of the fifteen different sub-integer pixel locations, each of the sets of filter support comprising a different respective combination of one or more full integer pixels of a reference picture including the reference block or one or more sub-integer pixels of the reference picture, each of the combinations of the one or more full integer pixels or the one or more sub-integer pixels having a total of six or more full-integer pixels or sub-integer pixels arranged in a linear shape in the reference picture;

interpolate a value for a prediction block for the current block at a full integer pixel location corresponding to the sub-integer pixel location, wherein to interpolate the value, the one or more processors are configured to apply an interpolation filter to the set of filter support for the sub-integer pixel location, the interpolation filter having six or more taps; and combine a residual block for the current block with the prediction block to decode the current block.

10. The device of claim 9, wherein, for each respective sub-integer pixel location of the sub-integer pixel locations associated with the full integer pixel, the set of filter support for the respective sub-integer pixel location has a horizontal or vertical shape.

11. The device of claim 9, wherein each of the sub-integer pixel locations associated with the full integer pixel uses a different interpolation filter.

12. The device of claim 9, wherein the one or more processors are configured to:

select, based on previously encoded frames, the set of filter support for the sub-integer pixel location.

13. A device for encoding video data, the device comprising:

a memory configured to store the video data; and one or more processors configured to:

determine a sub-integer pixel location of a reference block identified by a motion vector for a current block of video data, the motion vector having sub-pixel precision identifying the sub-integer pixel location of the reference block, the sub-integer pixel location being one of a total of fifteen different sub-integer pixel locations associated with a full integer pixel of the reference block;

determine a set of filter support for the sub-integer pixel location from a set of fifteen different sets of filter support, each of the fifteen sets of filter support being associated with a different sub-integer pixel location of the fifteen different sub-integer pixel locations, each of the sets of filter support comprising a different respective combination of one or more full integer pixels of a reference picture including the reference block or one or more sub-integer pixels of the reference picture, each of the combinations of the one or more full integer pixels or the one or more sub-integer pixels having a total of six or more full-integer pixels or sub-integer pixels arranged in a linear shape in the reference picture;

interpolate a value for a prediction block for the current block at a full integer pixel location corresponding to the sub-integer pixel location, wherein the means for interpolating comprises means for applying an interpolation filter to the set of filter support for the sub-integer pixel location, the interpolation filter having six or more taps; and subtract the prediction block from the current block being encoded to generate a residual block.

14. The device of claim 13, wherein, for each respective sub-integer pixel location of the sub-integer pixel locations associated with the full integer pixel, the set of filter support for the respective sub-integer pixel location has a horizontal or vertical shape.

15. The device of claim 13, wherein each of the sub-integer pixel locations associated with the full integer pixel uses a different interpolation filter.

16. The device of claim 13, wherein the one or more processors are configured to:

select, based on previously encoded frames, the set of filter support for the sub-integer pixel location of the respective sample.

17. A device for decoding video data, the device comprising:

means for determining a sub-integer pixel location of a reference block identified by a motion vector for a current block of video data, the motion vector having sub-pixel precision identifying the sub-integer pixel location of the reference block, the sub-integer pixel location being one of a total of fifteen different sub-integer pixel locations associated with a full integer pixel of the reference block;

means for determining a set of filter support for the sub-integer pixel location from a set of fifteen different sets of filter support, each of the fifteen sets of filter support being associated with a different sub-integer pixel location of the fifteen different sub-integer pixel locations, each of the sets of filter support comprising a different respective combination of one or more full integer pixels of a reference picture including the reference block or one or more sub-integer pixels of the reference picture, each of the combinations of the one or more full integer pixels or the one or more sub-integer pixels having a total of six or more full-integer pixels or sub-integer pixels arranged in a linear shape in the reference picture;

means for interpolating a value for a prediction block for the current block at a full integer pixel location corresponding to the sub-integer pixel location, wherein the means for interpolating comprises means for applying an interpolation filter to the set of filter support for the sub-integer pixel location, the interpolation filter having six or more taps; and means for combining a residual block for the current block with the prediction block to decode the current block.

18. The device of claim 17, wherein, for each respective sub-integer pixel location of the sub-integer pixel locations associated with the full integer pixel, the set of filter support for the respective sub-integer pixel location has a horizontal or vertical shape.

19. The device of claim 17, wherein each of the sub-integer pixel locations associated with the full integer pixel uses a different interpolation filter.

20. The device of claim 17, further comprising:

means for selecting, based on previously encoded frames, the set of filter support for the sub-integer pixel location of the respective sample.

21. A device for encoding video data, the device comprising:

means for determining a sub-integer pixel location of a reference block identified by a motion vector for a current block of video data, the motion vector having sub-pixel precision identifying the sub-integer pixel location of the reference block, the sub-integer pixel location being one of a total of fifteen different sub-integer pixel locations associated with a full integer pixel of the reference block;

means for determining a set of filter support for the sub-integer pixel location from a set of fifteen different sets of filter support, each of the fifteen sets of filter support being associated with a different sub-integer pixel location of the fifteen different sub-integer pixel locations, each of the sets of filter support comprising a different respective combination of one or more full integer pixels of a reference picture including the reference block or one or more sub-integer pixels of the reference picture, each of the combinations of the one or more full integer pixels or the one or more sub-integer pixels having a total of six or more full-integer pixels or sub-integer pixels arranged in a linear shape in the reference picture;

means for interpolating a value for a prediction block for the current block at a full integer pixel location corresponding to the sub-integer pixel location, wherein the means interpolating comprises means for applying an interpolation filter to the set of filter support for the sub-integer pixel location, the interpolation filter having six or more taps; and means for subtracting the prediction block from the current block being encoded to generate a residual block.

22. The device of claim 21, wherein, for each respective sub-integer pixel location of the sub-integer pixel locations associated with the full integer pixel, the set of filter support for the respective sub-integer pixel location has a horizontal or vertical shape.

23. The device of claim 21, wherein each of the sub-integer pixel locations associated with the full integer pixel uses a different interpolation filter.

24. The device of claim 21, further comprising:
means for selecting, based on previously encoded frames, the set of filter support for the sub-integer pixel location of the respective sample.

25. A non-transitory computer-readable storage medium having stored thereon instructions that, when executed, cause a processor of a video decoding device to:
determine a sub-integer pixel location of a reference block identified by a motion vector for a current block of video data, the motion vector having sub-pixel precision identifying the sub-integer pixel location of the reference block, the sub-integer pixel location being one of a total of fifteen different sub-integer pixel locations associated with a full integer pixel of the reference block;
determine a set of filter support for the sub-integer pixel location from a set of fifteen different sets of filter support, each of the fifteen sets of filter support being associated with a different sub-integer pixel location of the fifteen different sub-integer pixel locations, each of the sets of filter support comprising a different respective combination of one or more full integer pixels of a reference picture including the reference block or one or more sub-integer pixels of the reference picture, each of the combinations of the one or more full integer pixels or the one or more sub-integer pixels having a total of six or more full-integer pixels or sub-integer pixels arranged in a linear shape in the reference picture;
interpolate a value for a prediction block for the current block at a full integer pixel location corresponding to the sub-integer pixel location, wherein the instructions that cause the processor to interpolate the value comprise instructions that cause the processor to apply an interpolation filter to the set of filter support for the sub-integer pixel location, the interpolation filter having six or more taps; and
combine a residual block for the current block with the prediction block to decode the current block.

26. The non-transitory computer-readable storage medium of claim 25, wherein, for each respective sub-integer pixel location of the sub-integer pixel locations associated with the full integer pixel, the set of filter support for the respective sub-integer pixel location has a horizontal or vertical shape.

27. The non-transitory computer-readable storage medium of claim 25, wherein each of the sub-integer pixel locations associated with the full integer pixel uses a different interpolation filter.

28. The non-transitory computer-readable storage medium of claim 25, wherein the instructions further cause the processor to:
select, based on previously encoded frames, the set of filter support for the sub-integer pixel location of the respective sample.

29. A non-transitory computer-readable storage medium having stored thereon instructions that, when executed, cause a processor of a video encoding device to:
determine a sub-integer pixel location of a reference block identified by a motion vector for a current block of video data, the motion vector having sub-pixel precision identifying the sub-integer pixel location of the reference block, the sub-integer pixel location being one of a total of fifteen different sub-integer pixel locations associated with a full integer pixel of the reference block;
determine a set of filter support for the sub-integer pixel location from a set of fifteen different sets of filter support, each of the fifteen sets of filter support being associated with a different sub-integer pixel location of the fifteen different sub-integer pixel locations, each of the sets of filter support comprising a different respective combination of one or more full integer pixels of a reference picture including the reference block or one or more sub-integer pixels of the reference picture, each of the combinations of the one or more full integer pixels or the one or more sub-integer pixels having a total of six or more full-integer pixels or sub-integer pixels arranged in a linear shape in the reference picture;
interpolate a value for a prediction block for the current block at a full integer pixel location corresponding to the sub-integer pixel location, wherein the instructions that cause the processor to interpolate the value comprise instructions that cause the processor to apply an interpolation filter to the set of filter support for the sub-integer pixel location, the interpolation filter having six or more taps; and
subtract the prediction block from the current block being encoded to generate a residual block.

30. The non-transitory computer-readable storage medium of claim 29, wherein, for each respective sub-integer pixel location of the sub-integer pixel locations associated with the full integer pixel, the set of filter support for the respective sub-integer pixel location has a horizontal or vertical shape.

31. The non-transitory computer-readable storage medium of claim 29, wherein each of the sub-integer pixel locations associated with the full integer pixel uses a different interpolation filter.

32. The non-transitory computer-readable storage medium of claim 31, wherein the instructions further cause the processor to:
   select, based on previously encoded frames, the set of filter support for the sub-integer pixel location of the respective sample.

33. The method of claim 1, the method being executable on a wireless communication device, wherein the device comprises:
   a memory configured to store video data;
   a processor configured to execute instructions to process the video data stored in said memory;
   a receiver configured to receive an encoded representation of the video data.

34. The method of claim 33, wherein the wireless communication device is a cellular telephone and the encoded representation of the video data is received by the receiver and modulated according to a cellular communication standard.

35. The device of claim 9, wherein the device is a wireless communication device, further comprising:
   a receiver configured to receive an encoded representation of the video data.

36. The device of claim 35, wherein the wireless communication device is a cellular telephone and the encoded representation of the video data is received by the receiver and modulated according to a cellular communication standard.

* * * * *